(12) United States Patent
Shaw et al.

(10) Patent No.: US 10,257,573 B2
(45) Date of Patent: Apr. 9, 2019

(54) DELIVERING CONTENT

(71) Applicant: PIKSEL, Inc., Wilmington, DE (US)

(72) Inventors: Philip Shaw, York (GB); Hans-Jurgen Maas, Mainz (DE); Mark Christie, London (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/531,331

(22) PCT Filed: Nov. 26, 2015

(86) PCT No.: PCT/EP2015/077829
§ 371 (c)(1),
(2) Date: May 26, 2017

(87) PCT Pub. No.: WO2016/083534
PCT Pub. Date: Jun. 2, 2016

(65) Prior Publication Data
US 2017/0332122 A1    Nov. 16, 2017

(30) Foreign Application Priority Data

Nov. 26, 2014 (GB) .................................. 1421012.4
Nov. 26, 2014 (WO) ................. PCT/EP2014/075713
Mar. 27, 2015 (GB) .................................. 1505291.3

(51) Int. Cl.
*H04N 21/41* (2011.01)
*H04N 21/81* (2011.01)
(Continued)

(52) U.S. Cl.
CPC ..... *H04N 21/44222* (2013.01); *H04N 21/235* (2013.01); *H04N 21/25435* (2013.01);
(Continued)

(58) Field of Classification Search
CPC ............. H04N 21/2668; H04N 21/235; H04N 21/44222
See application file for complete search history.

(56) References Cited

U.S. PATENT DOCUMENTS 6,986,039 B1 * 1/2006 Leah ....................... G06F 21/31
380/274
7,047,302 B1 * 5/2006 Chatani ................... A63F 13/12
705/14.73

(Continued)

FOREIGN PATENT DOCUMENTS

EP            0817486 A2    7/1998
WO   WO 2013/015919 A2    1/2013
WO        2015/023994 A1    2/2015

OTHER PUBLICATIONS

Search Report under Section 17(5), dated May 10, 2016, Intellectual Property Office, Great Britain.
(Continued)

*Primary Examiner* — Nasser M Goodarzi
*Assistant Examiner* — Adil Ocak
(74) *Attorney, Agent, or Firm* — Holzer Patel Drennan

(57) ABSTRACT

In one embodiment, there is a content delivery system comprising: a communication network; a media component configured to transmit media content and associated metadata to user devices; a store holding permission vouchers for users of the system; an auxiliary content management component configured to: receive a request for auxiliary content insertion information from a user device, the request comprising an identifier of a user of the user device and an identifier of desired media content; access said store to determine permission for consumption of the desired media content in a resource constrained playout mode at the device based on at least one permission voucher for the user; generate auxiliary content insertion information based on the
(Continued)

identifier of the user, the identifier of the desired media content and the at least one permission voucher; and transmit the generated auxiliary content insertion information to the user device.

20 Claims, 11 Drawing Sheets

(51) Int. Cl.
    *H04N 21/235*     (2011.01)
    *H04N 21/258*     (2011.01)
    *H04N 21/442*     (2011.01)
    *H04N 21/462*     (2011.01)
    *H04N 21/475*     (2011.01)
    *H04N 21/845*     (2011.01)
    *H04N 21/2543*     (2011.01)
    *H04N 21/2668*     (2011.01)
    *H04N 21/4784*     (2011.01)
(52) U.S. Cl.
    CPC ... *H04N 21/25891* (2013.01); *H04N 21/2668* (2013.01); *H04N 21/44218* (2013.01); *H04N 21/4621* (2013.01); *H04N 21/4758* (2013.01); *H04N 21/4784* (2013.01); *H04N 21/812* (2013.01); *H04N 21/8453* (2013.01); *H04N 21/41* (2013.01)

(56) References Cited

U.S. PATENT DOCUMENTS

| | | | |
|---|---|---|---|
| 8,495,671 B1* | 7/2013 | Ribeiro | H04H 60/33 725/11 |
| 2011/0093715 A1* | 4/2011 | Kanee | G11B 20/00086 713/176 |
| 2011/0218858 A1* | 9/2011 | Christensen | G06Q 30/0253 705/14.51 |
| 2012/0110616 A1 | 5/2012 | Kilar et al. | |
| 2013/0031579 A1 | 1/2013 | Klappert et al. | |
| 2014/0075466 A1 | 3/2014 | Zhao | |
| 2015/0046271 A1* | 2/2015 | Scholl | G06Q 30/02 705/15 |

OTHER PUBLICATIONS

International Search Report and Written Opinion, dated Feb. 25, 2016, European Patent Office.

\* cited by examiner

DELIVERING CONTENT

TECHNICAL FIELD

This invention relates to delivering content to a user.

BACKGROUND

Computer devices exist which are considered to display content to a user on demand. For example, subscription services allow a user to select particular television channels which are made available to a user device on which a user can view the channels. Viewing of the channels can be subject to payment. When subject to payment, access to the content is controlled by determining whether or not the user has made a payment for the content and as such is permitted to view it. In a subscription service content can be live/linear. Other on-demand content is available, such as, On-Demand TV which allows individual programmes to be begun at the viewer's leisure.

Other types of content are also available on demand, for example, downloaded or streamed to a user following suitable payment, as with On Demand TV or pay per view (PPV).

When using their devices nowadays, users are subject to potentially a very large amount of what is referred to as herein "auxiliary content". This is used to reference content which is not actually requested by a user but which is nevertheless directed to a user and played out at a user device (whether or not the user wants it). User devices include media players, such as digital video players, which are designed to play out at a screen or other output element of a user device auxiliary content which is received at that device in addition to content selected by a user.

Although users have not requested auxiliary content, they are generally tolerant of receiving and playing out a certain amount of auxiliary content, particularly where the receipt and play-out of that auxiliary content means that the user does not have to pay for the content that they did desire to receive. Auxiliary content can be provided in many different forms, including video content, static image, text based content, audio content. Although the present document is focussed mainly on the play-out of full media (video and audio) content, it will be appreciated that other forms of content are also available.

SUMMARY

According to one aspect of the present disclosure there is provided a content delivery system comprising: a communication network; a media component connected to the communication network and configured in response to receiving a request for desired media content from a user device, to transmit the desired media content and metadata associated with the media content to the user device; a store holding permission vouchers for users of the content delivery system; an auxiliary content management component configured to: receive over the communication network a request for auxiliary content insertion information from the user device, the request comprising an identifier of a user associated with the user device and an identifier of the desired media content; access said store to determine permission for consumption of the desired media content in a resource constrained playout mode at the user device based on at least one permission voucher for the user, wherein in the resource constrained playout mode determined for the user, auxiliary content associated with the desired media content is reduced for the user; generate auxiliary content insertion information based on the identifier of the user, the identifier of the desired media content and the at least one permission voucher for the user; and transmit the generated auxiliary content insertion information over the communication network to the user device.

The auxiliary content management component may be configured to determine whether the desired media content is to be consumed in a playout session at the user device with auxiliary content inserted in the playout session based on the identifier of the user, the identifier of the desired media content and the at least one permission voucher for the user, and the generation of the auxiliary content insertion information is based on this determination.

In response to a determination that the desired media content is to be consumed in a playout session at the user device with auxiliary content inserted in the playout session, the auxiliary content management component may be configured to generate the auxiliary content insertion information to include metadata identifying auxiliary content that is to be inserted in the playout session.

For each piece of auxiliary content that is to be inserted in the playout session, metadata associated with the piece of auxiliary content may comprise at least (i) an identifier enabling access to the piece of auxiliary content stored in an auxiliary content store connected to the communication network; and (ii) a timing offset indicating when the piece of auxiliary content is to be played out in the playout session in relation to the desired media content.

For each piece of auxiliary content that is to be inserted in the playout session, metadata associated with the piece of auxiliary content may further comprise an event trigger that causes the user device to transmit a tracking message to the auxiliary content management component upon detecting that playout of the piece of auxiliary content has been skipped by the user.

When the at least one permission voucher comprises a permission voucher granting permission for the user to consume the desired media content in the playout session with no auxiliary content inserted in at least one location in the playout session, the auxiliary content management component may be configured to generate the auxiliary content insertion information to not include any metadata of auxiliary content to be inserted at said at least one location that would otherwise be included by the auxiliary content management component based on only the identifier of the user and the identifier of the desired media content.

When the at least one permission voucher comprises a permission voucher granting permission for the user to consume the desired media content in the playout session with reduced auxiliary content inserted in at least one location in the playout session, the auxiliary content management component is configured to generate the auxiliary content insertion information to include metadata identifying a reduced number of pieces of auxiliary content to be inserted at said at least one location than that which would otherwise be identified based on only the identifier of the user and the identifier of the desired media content.

When the at least one permission voucher for the user indicates that the auxiliary content that would otherwise be included by the auxiliary content management component based on only the identifier of the user and the identifier of the desired media content is to be played out to the user at a later point in time, the auxiliary content management component may be configured to store the metadata of the auxiliary content and timing information indicating when the auxiliary content is to be played out to the user, for use in generating auxiliary content insertion information when a subsequent request for auxiliary content insertion information is received that comprises the identifier of the user.

When the at least one permission voucher for the user indicates that the auxiliary content that would otherwise be included by the auxiliary content management component based on only the identifier of the user and the identifier of the desired media content is to be deferred to a companion user device associated with the user, the auxiliary content management component may be configured to store the metadata of the auxiliary content for use in generating auxiliary content insertion information when a subsequent request for auxiliary content insertion information is received from the companion user device that comprises the identifier of the user.

The at least one location in the playout session may comprise one or any combination of: a location before playout of the desired media content; one or more locations during playout of the desired media content; and a location after playout of the desired media content.

The auxiliary content management component may be configured to obtain information on one or any combination of: a genre of the desired media content, a gender of the user, an age of the user and a device type of the user device, and determine the auxiliary content that is to be inserted in the playout session based on said information; wherein the auxiliary content management component may be configured to obtain said information based on at least one of: (i) extracting said information from said request, and (ii) accessing said information from a store in the content delivery system using the identifier of the user.

In response to a determination that the desired media content is to be consumed in a playout session at the user device with no auxiliary content inserted in the playout session, the auxiliary content management component may be configured to generate the auxiliary content insertion information to include no metadata identifying auxiliary content that is to be inserted in the playout session.

According to another aspect of the present disclosure there is provided an auxiliary content management component for a content delivery system, the auxiliary content management component having access to a store holding permission vouchers for users of the content delivery system, the auxiliary content management component configured to: receive over a communication network a request for auxiliary content insertion information from a user device, the request comprising an identifier of a user associated with the user device and an identifier of desired media content transmitted to the user device from a media component connected to the communication network; access said store to determine permission for consumption of the desired media content in a resource constrained playout mode at the user device based on at least one permission voucher for the user, wherein in the resource constrained playout mode determined for the user, auxiliary content associated with the desired media content is reduced for the user; generate auxiliary content insertion information based on the identifier of the user, the identifier of the desired media content and the at least one permission voucher for the user; and transmit the generated auxiliary content insertion information over the communication network to the user device.

According to another aspect of the present disclosure there is provided a computer program product, the computer program product being embodied on a non-transient computer-readable medium and configured so as when executed on a processor to: receive over a communication network a request for auxiliary content insertion information from a user device, the request comprising an identifier of a user associated with the user device and an identifier of desired media content transmitted to the user device from a media component connected to the communication network; access a store holding permission vouchers for users of a content delivery system to determine permission for consumption of the desired media content in a resource constrained playout mode at the user device based on at least one permission voucher for the user, wherein in the resource constrained playout mode determined for the user, auxiliary content associated with the desired media content is reduced for the user; generate auxiliary content insertion information based on the identifier of the user, the identifier of the desired media content and the at least one permission voucher for the user; and transmit the generated auxiliary content insertion information over the communication network to the user device.

According to another aspect of the present disclosure there is provided a computer implemented method on a viewing device of controlling content to be viewed on the viewing device, the method comprising: detecting at a user interface of the viewing device a selection by a user of desired content to be viewed on the viewing device, and in response, transmitting via a network interface of the viewing device a request for the desired content to a media server; receiving the desired content from the media server, the desired content associated with auxiliary content to be played out by a player of the device in a play out session comprising the auxiliary content and the desired content; detecting selection by the user of a resource constrained play out mode; generating a request to a control module to seek permission that the resource constrained play out mode is available to the user; and on receiving a permission signal from the control module, causing the current play out session to be played out on the viewing device in the resource constrained play out mode.

The method may comprise displaying to a user an option for desired content in a content consumption format with reduced auxiliary content, wherein the step of detecting selection by the user of a resource constrained play out mode comprises detecting that a user has selected the content consumption format with reduced auxiliary content.

The method may comprise a step of receiving and displaying to a user a list of content consumption formats for a piece of content, each format being associated with a differing set of auxiliary content.

The method may comprise a step of displaying a points balance to a user to enable a user to determine whether selection of the resourced constrained play out mode will receive a permission signal.

The method may comprise detecting selection by the user to skip playout of at least one piece of the reduced auxiliary content; generating a request to the control module to seek permission that the at least one piece of the reduced auxiliary content can be skipped; and on receiving a permission signal from the control module, adapting playback of the desired content to skip playout of the at least one piece of the reduced auxiliary content in the play out session.

The step of detecting selection by the user of a resource constrained play out mode may be effected after auxiliary content has commenced to play in the play out session, and wherein the step of causing the current play out session to be played out in the resource constrained play out mode comprises adapting playback of the desired content to skip playout of auxiliary content in the play out session that is identified based on the permission signal.

The method may comprise for each piece of skipped auxiliary content, generating and transmitting a tracking message to an auxiliary content management component to indicate that the piece of auxiliary content has been skipped.

The tracking message may comprise an identifier to cause the skipped auxiliary content to be played out on a companion viewing device associated with the user.

The tracking message may comprise an identifier to cause the skipped auxiliary content to be played out in a future play out session on the viewing device.

The method may comprise for each piece of skipped auxiliary content, receiving a list of options for alternative auxiliary content to be played out after the current play out session.

The method may comprise detecting selection by the user of one of the options, playing out the current play out session including the desired content, and causing the selected option of auxiliary content to be played out in a future play out session on the viewing device or on a companion viewing device associated with the user.

The method may comprise displaying to a user an icon indicating that a resource constrained play out mode permitting skipping of the auxiliary content is available.

If a permission signal is not received, a message may be displayed to a user indicating that the option of the resource constrained play out mode is not available.

According to another aspect of the present disclosure there is provided a computer program product, the computer program product being embodied on a non-transient computer-readable medium and configured so as when executed on a processor to perform any of the methods described herein.

According to another aspect of the present disclosure there is provided a viewing device configured to control content to be viewed on the viewing device, the viewing device configured to: detect at a user interface of the viewing device a selection by a user of desired content to be viewed on the viewing device, and in response, transmit via a network interface of the viewing device a request for the desired content to a media server; receive the desired content from the media server, the desired content associated with auxiliary content to be played out by a player of the device in a play out session comprising the auxiliary content and the desired content; detect selection by the user of a resource constrained play out mode; generate a request to a control module to seek permission that the resource constrained play out mode is available to the user; and on receiving a permission signal from the control module, cause the current play out session to be played out on the viewing device in the resource constrained play out mode.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
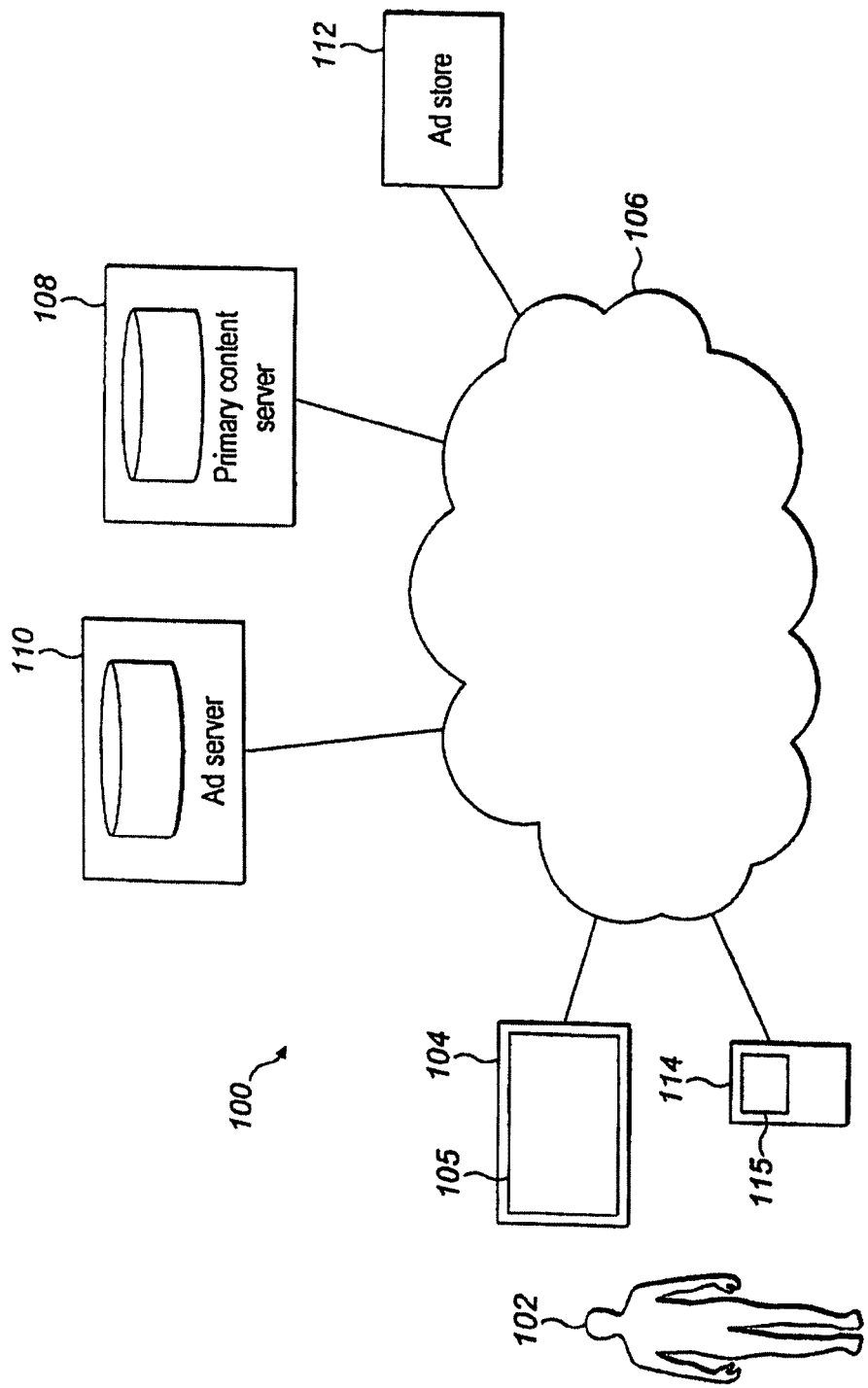
FIG. 1 shows a content delivery system.

Reference is first made to FIG. 1 to show the infrastructure within which embodiments of the invention are implemented.

FIG. 1 shows a content delivery system 100. A content consuming user 102 (current content consumer) operates a media playback device 104 with a display 105 that is capable of connecting to a computer network 106 of the content delivery system 100. The media playback device 104 is a computer device in the form of, for example, a television, smartphone device, tablet computing device, etc. The computer network 106 is a packet-based network such as the Internet in this embodiment but may not be packet-based in other embodiments.

The content consuming user 102 may also have a companion user device 114 with a display. This companion user device 114 can take the form of any kind of computer device including but not limited to tablets, mobile phones, smartphones, laptops, etc.

Both the media playback device 104 and the companion user device 114 have a network connection for connecting to the computer network 106. The network connection can be wired such as Ethernet or wireless (WiFi, GSM etc), or any suitable interface which allows communication with the network 106. The media playback device 104 and the companion user device 114 may connect to the computer network 106 using the same type of network connection or different types of network connections.

Connected to the network 106 is a primary content providing server 108 of the content delivery system 100 which holds primary (desired) content for delivering to users of the content delivery system 100. The media content is stored in the form of a collection of media assets (that is, individual pieces of media content), each media asset being, for example, an episode of a television show, a movie, or a recording of a sports event (e.g. football match) etc.

Also connected to the network 106 is an auxiliary content providing server 110 of the content delivery system 100 which holds an auxiliary content database identifying different pieces of auxiliary content (e.g. video content, static image content, text-based content, audio content etc.) that can be delivered to users of the content delivery system 100. For example, in some embodiments the database is a database of network locations (e.g. web addresses in the form of a Uniform Resource Locators (URLs)) at which the auxiliary content is available. One particular type of auxiliary content is advertising content. In particular embodiments, the server 110 is an ad ("advertisement") server holding a database of advertising content.

Also connected to the network 106 is one or more auxiliary content store 112 that stores the auxiliary content described above. Each of the one or more auxiliary content stores may be addressable for example using a URL referred to above.

Figure 2:
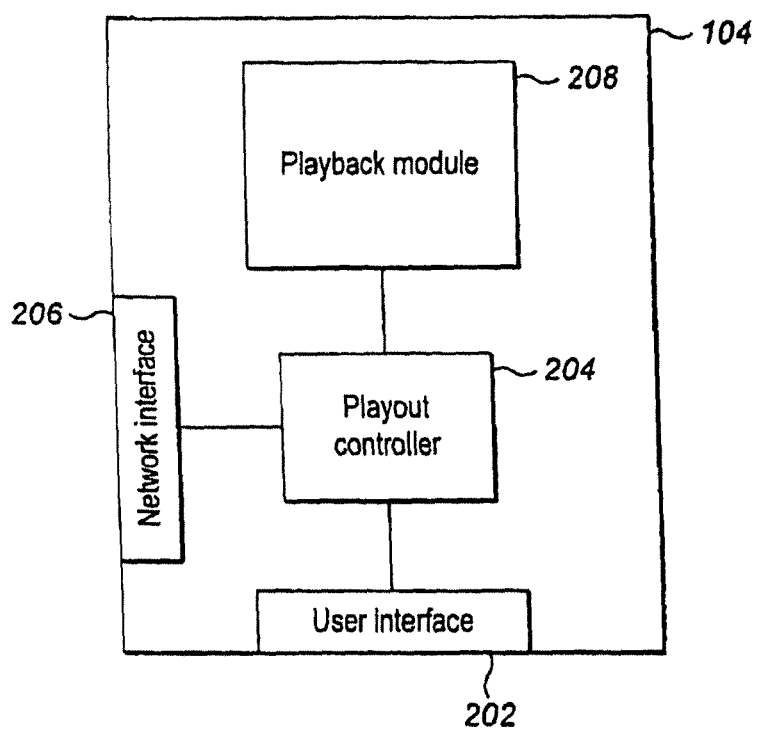
FIG. 2 shows a schematic view of a media playback device.

FIG. 2 is a schematic block diagram of the media playback device 104. The companion user device 114 comprises the same components of the media playback device 104 that are shown in FIG. 2.

The media playback device 104 comprises a user interface 202 for receiving user inputs from the content consuming user 102. The user interface 202 may take various forms, for example an infra-red (IR) receiver for receiving control signals from an IR remote control unit operated by the content consuming user 102, a touch-screen of the media playback device 104, or another input device such as a keypad, mouse, or microphone (for receiving voice commands).

The media playback device 104 is arranged to display media content that is available for selection by the content consuming user 102 on the display 105 of the media playback device 104. A content consuming user 102 is able to select desired media content that they wish to consume by supplying an input that is received by the user interface 202.

The media playback device 104 comprises a playout controller 204 that is coupled to the user interface 202 which enables the playout controller 204 configured to detect that a selection of desired media content has been made by the content consuming user 102.

The media playback device 104 further comprises a network interface 206 for connecting to the computer network 106. The network interface 206 can be wired interface such as an Ethernet interface, a wireless interface (WiFi, GSM etc), or any other suitable interface which allows communication with the network 106.

In response to detecting a selection of desired media content by the content consuming user 102, the playout controller 204 is configured to transmit a request for the desired media content over the network 106 to the primary content server 108, and in response, receive the desired media content from the primary content server 108.

The playout controller 204 is configured to supply the desired media content to a playback module 208 of the media playback device 104 for playout to the content consuming user 102. For example, if the desired media content is video content (e.g. a TV episode), the playback module 208 handles the output of the desired media content to the display 105.

Embodiments of the present disclosure relate to the delivery of desired media content that is associated with auxiliary content that is to be played out to the content consuming user 102 (by the playback module 208 of the media playback device 104, or by the companion user device 114).

In addition to receiving the desired media content from the primary content server 108, the playout controller 204 also receives metadata associated with the desired media content. As is well known to persons skilled in the art, this metadata may include information such the title of the desired media content, asset id (e.g. content identifier) of the desired media content, the playback length if the desired media content etc.

In response to receipt of the desired media content and its associated metadata, the playout controller 204 is configured to transmit a request for an auxiliary content insertion information (e.g an ad manifest) that is associated with the desired media content to the auxiliary content server 110. The request includes an identifier of the content consuming user 102 (e.g. an account number of a media consumption account of the content consuming user 102) and an identifier of the desired media content.

In response to transmitting this request to the auxiliary content server 110, the playout controller 204 receives auxiliary content insertion information from the auxiliary content server 110. The auxiliary content insertion information indicates if auxiliary content is to be played out prior to, during and/or after playout of the desired media content. If so, the auxiliary content insertion information comprises metadata identifying the auxiliary content.

The auxiliary content insertion information includes, for each piece of auxiliary content that is to be played in a particular break, an identifier (e.g. a URL) of an auxiliary content store 112 in the network 106 where the auxiliary content is stored and other metadata associated with the piece of auxiliary content.

During playback of the desired media content the playout controller 204 is configured to detect when a break for auxiliary content is approaching and in response to this detection, retrieve the auxiliary content to be played out in the break from the one or more auxiliary content store 112 using the using the identifier(s) referred to above, and control the playout of the retrieved auxiliary content by the playback module 208 during the breaks identified by the auxiliary content break pattern.

The metadata for each piece of auxiliary content referred to above may include information on how the auxiliary content is to be played and one or more tracking events that are to be reported to the auxiliary content server 110 when the event is detected by the playout controller 204 as the auxiliary content is played. The tracking event reports allow the auxiliary content server 110 to measure which pieces of auxiliary content were started, which failed because the ad creative was unavailable; which piece(s) of auxiliary content were watched all the way through; which piece(s) of auxiliary content only reached the half-way point before the viewer quit playback etc.

The playout controller 204 may interact with the auxiliary content server 110 in accordance with the Video Ad Serving Template (VAST) specification released by the Interactive Advertising Bureau (IAB). That is, the request for auxiliary content insertion information transmitted to the auxiliary content server 110 may be a VAST request, and the auxiliary content insertion information received from the auxiliary content server 110 may be a VAST response document (an XML document).

The inventors have identified that the content consuming user 102 may be consuming the desired content within limits of a constrained resource.

For example the content consuming user 102 may have limited time available to consume the desired media content. If the media playback device 104 is a mobile device, this may be due to the media playback device 104 having a limited amount of power (battery life) remaining at the time the content consuming user 102 selected to consume the desired media content. Alternatively or additionally, the user 102 may be consuming the desired content within bandwidth constraints of the network connection between the media playback device 104 and the network 106.

Embodiments of the present invention enable a device to deliver desired content to a user so that the content consuming user 102 can consume the desired media content within the limits of the constrained resource even when that content is associated with auxiliary content that should be played out.

This result may achieved by allowing auxiliary content data to be controlled based on monitoring user engagement data which allows accruement of reward points by the content consuming user 102 based on the content consuming user 102 consuming (e.g. watching, listening) auxiliary content or engaging with auxiliary content which allows adaption of auxiliary content for that content consuming user 102. Whilst embodiments are described herein with reference to rewards (otherwise referred to herein as permission vouchers) that are obtainable by redemption of reward points that are accrued through user consumption or engagement with auxiliary content, this is just one example of how a content consuming user 102 may obtain a reward and embodiments are not limited to this example. Embodiments extend to rewards that have been obtained via other methods known to persons skilled in the art e.g. payment, due to the media consumption account of the content consuming user 102 being active for a predetermined period of time, a promotion by a video on demand provider etc. Components in the network 106 which enable the content consuming user 102 to consume desired media content within the limits of a constrained resource are now described with reference to FIGS. 3a and 3b.

Figure 3A:
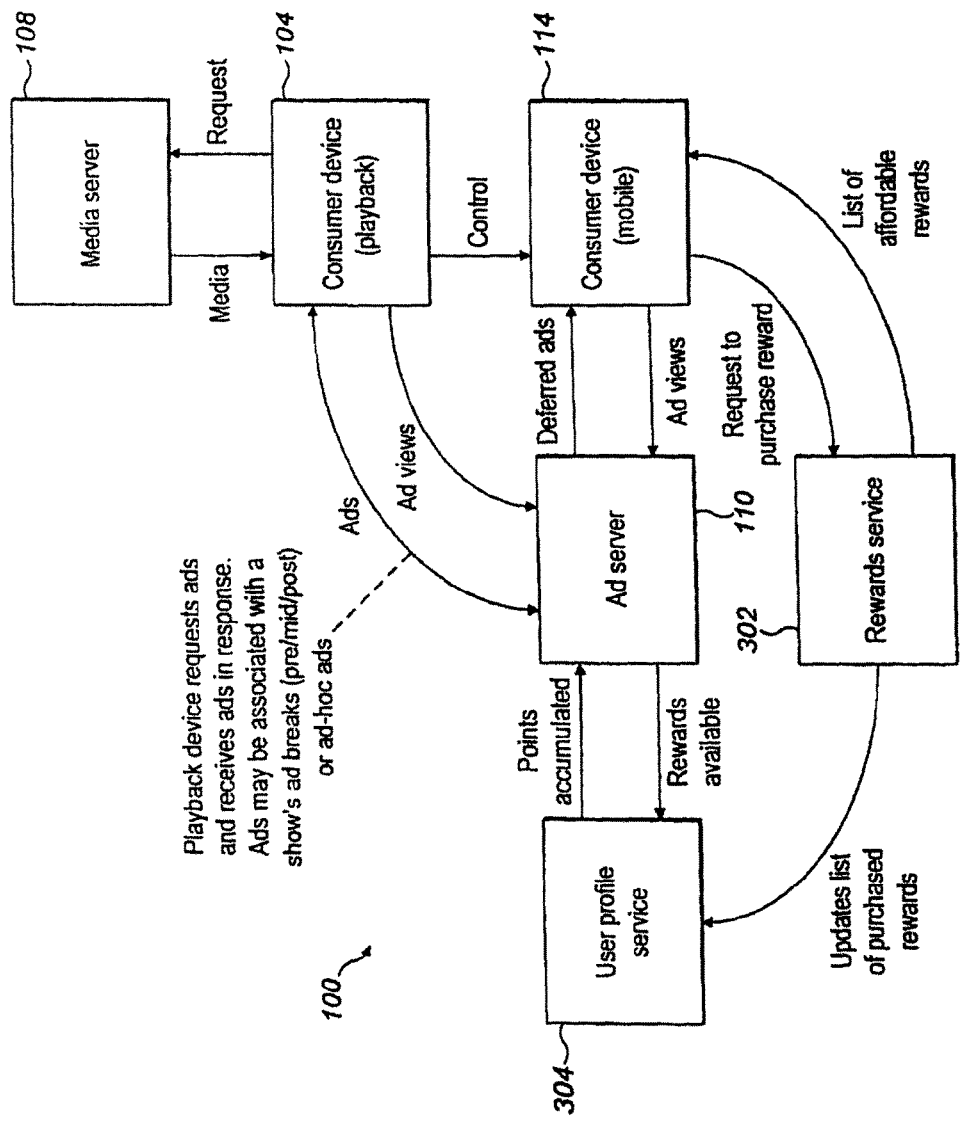
FIGS. 3a and 3b illustrates network components in the content delivery system.
Figure 3B:
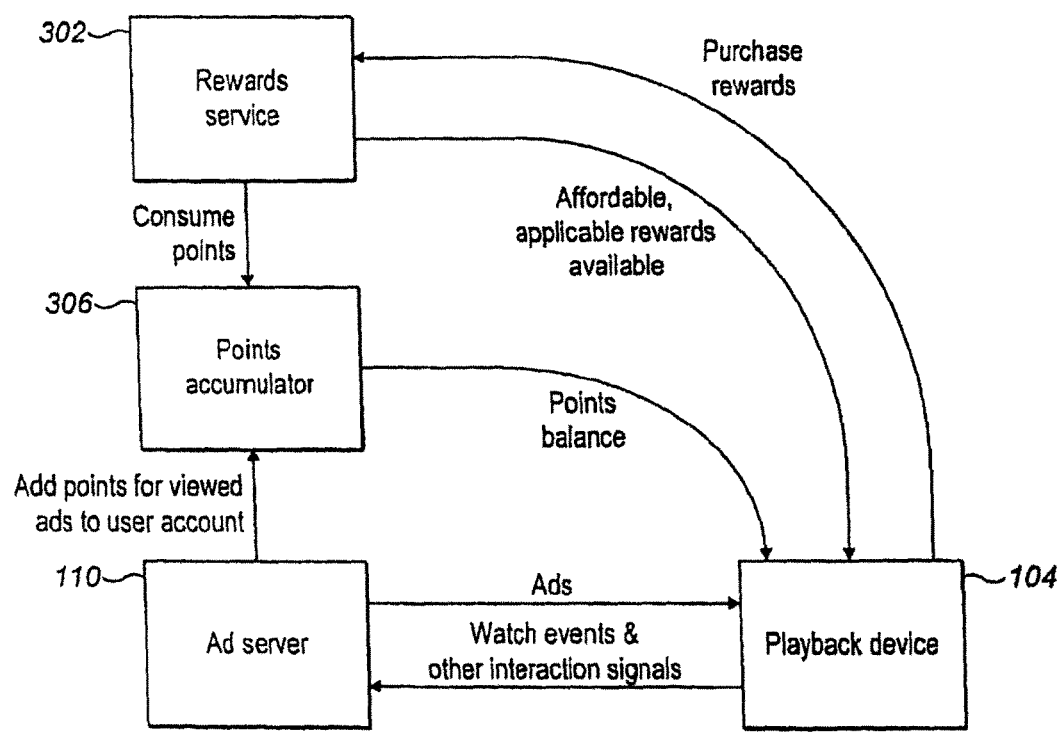

FIGS. 3a and 3b illustrates components of the content delivery system 100 described above with reference to FIG. 1 (i.e. the media playback device 104, companion user device 114, primary content server 108 and auxiliary content providing server 110).

In addition FIG. 3a illustrates a rewards service component 302 and a user profile service component 304. The rewards service component 302 may be implemented on a dedicated server connected to the network 106, alternatively the functionality of the rewards service 302 may be implemented on the auxiliary content providing server 110. Similarly, the user profile service component 304 may be implemented on a dedicated server connected to the network 106, alternatively the functionality of the user profile service 304 may be implemented on the auxiliary content providing server 110. Implementation of the rewards service component 302 and a user profile service component 304 on a network entity such as a server provides security against malicious users attempting to edit the information stored by these components.

FIG. 3b illustrates a reward points accumulator component 306. The reward points accumulator component 306 may be implemented on a dedicated server connected to the network 106, the server described above implementing the rewards service 302 functionality, the server described above implementing the user profile service component 304, or on the auxiliary content providing server 110.

FIGS. 3a and 3b illustrate the data that is transmitted between the components of the content delivery system 100. For example, FIG. 3a illustrates that the media playback device 104 is configured to transmit a request for desired media content over the network 106 to the primary content server 108, and in response, receive the desired media content from the primary content server 108 (described above). Furthermore, FIGS. 3a and 3b illustrates that the media playback device 104 is configured to transmit a request for auxiliary content insertion information to the auxiliary content server 110 over the network 106, and in response, receive auxiliary content insertion information from the auxiliary content server 110.

Other data that is transmitted between the components of the content delivery system 100 shown in FIGS. 3a and 3b is described below with reference to embodiments of the present invention.

Figure 4:
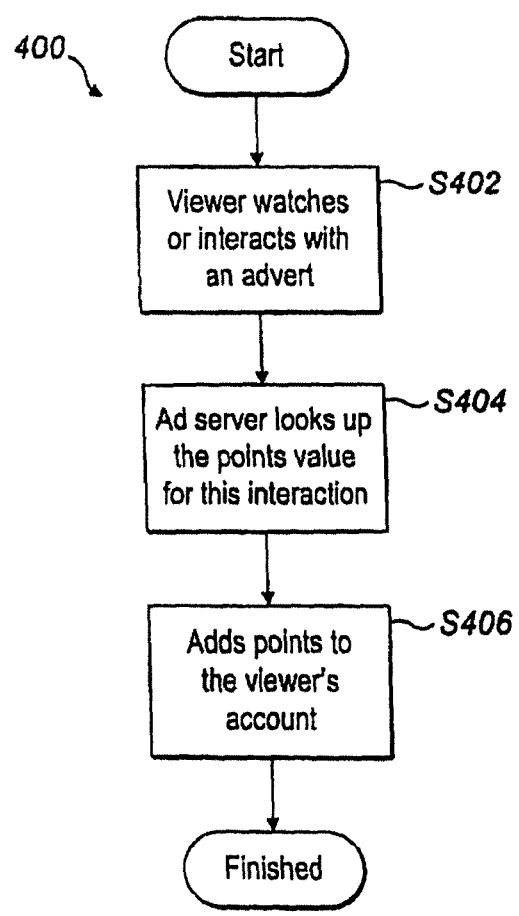
FIG. 4 illustrates a flow chart for a process of associating reward points with an account associated with a content consuming user.

Reference is now made to FIG. 4 which illustrates a process 400 performed by the auxiliary content providing server 110 for associating reward points with a media consumption account associated with the content consuming user 102. The user profile service 304 is configured to maintain information on accumulated reward points and available rewards (otherwise referred to herein as permission vouchers) for each user of the content delivery system 100.

At step S402, the auxiliary content providing server 110 detects that the content consuming user 102 has consumed or interacted with a piece of auxiliary content played out on the media playback device 104.

The auxiliary content providing server 110 is able to detect that the content consuming user 102 has consumed auxiliary content based on one or more tracking event reports received from the media playback device 104. This is illustrated by the "ad views" data flow shown in FIG. 3a and the "watch events" data flow shown in FIG. 3b.

The auxiliary content providing server 110 may detects that the content consuming user 102 has interacted with a piece of auxiliary content using one or more methods that are described below.

In a first method, after playback of auxiliary content on the media playback device 104 (detected by the auxiliary content providing server 110 based on a tracking event report received from the media playback device 104), the auxiliary content providing server 110 transmits a user engagement request to the companion user device 114 which causes a user engagement element to be shown on the display 115 of the companion user device 114 in the form of a question displayed to the content consuming user 102.

Alternatively, during playback of auxiliary content on the media playback device 104 (detected by the auxiliary content providing server 110 based on a tracking event report received from the media playback device 104), the auxiliary content providing server 110 transmits the user engagement request to the companion user device 114. This is so that the playout controller on the companion user device 114 can prepare the user engagement element to be shown on the display 115 at the end of playout of the auxiliary content, or to facilitate display of the user engagement element on the display 115 that may appear during playout of the auxiliary content.

The content consuming user 102 can engage with the user engagement element by supplying an input e.g. by responding to the question either by entering data into a field displayed to the content consuming user 102, or responding using voice (detected by a microphone of the companion user device 114), or responding by making a gesture. When the content consuming user 102 responds using voice or gesture, the playout controller on the companion user device 114 detects the voice/gesture and recognises the user response.

After this user engagement, a user engagement response is transmitted from the companion user device 114 to the auxiliary content providing server 110. This is illustrated by the "Ad views" data flow shown in FIG. 3a.

The auxiliary content providing server 110 detects whether or not the content consuming user 102 has responded properly by assessing whether an expected user actuation has been executed. For example, where a response is to be entered in text, the quality of the text is assessed to ensure it is meaningful. Where a user selection is made (multiple choice), only the set number of selections should be made. The playout controller on the companion user device 114 may comprise sufficient logic to validate an input (e.g. when only one option from a multiple choice selection is permitted, to check that only one option from the multiple choice selection has been made), but only the auxiliary content providing server 110 would check if a validated answer is the correct one. Similarly, only the auxiliary content providing server 110 allocates points.

The user engagement element can comprise a survey which includes multiple questions with associated fields for responses, wherein the questions and responses concern the auxiliary content. The user engagement element can take alternative forms to a survey requiring text responses. It could be a kind of game, or multiple choice. Any kind of user engagement element permitting a monitorable user response is envisaged.

In the above embodiment, the companion user device 114 operates to select the desired content and operates to display the auxiliary content (for example, the advertisement) and the user engagement elements (such as the survey). However, the principles described herein can also be applied to a scenario where there is a single device which both plays the desired content, the auxiliary content and the user engagement element. That same device can be used to select the content. A further alternative is to have a companion device used to select the content, where the desired content, auxiliary content and user engagement elements are displayed on a separate device. In yet a further alternative, auxiliary content and user engagement elements are displayed on a plurality of devices if a group of viewers is present. This enables the auxiliary content, and therefore the user engagement elements to be tailored to each of the viewers in the group. This enables each of the viewers to receive auxiliary content and user engagement elements that is potentially customised for them explicitly. For example, a television advert for a clothes retailer displayed on the media playback device 104 might have a secondary experience on a mobile device that shows men's clothes to male viewers and ladies' clothes to female viewers.

Where one device is used to display the desired content, the auxiliary content and the user engagement elements, two separate display portions or a picture in picture technology can be utilised. Alternatively, the auxiliary content can be displayed first, followed by the user engagement element and then followed by the desired content on the same screen.

In a second method, during playback of auxiliary content on the media playback device 104 (detected by the auxiliary content providing server 110 based on a tracking event report received from the media playback device 104), the auxiliary content providing server 110 transmits a user engagement request to the media playback device 104 which causes a user engagement instruction to be output from the media playback device 104 to the content consuming user 102. For example an audible user engagement instruction may be output from speakers of the media playback device 104 or a visual user engagement instruction may be shown on the display 114 of the media playback device 104. The user engagement instruction encourages the content consuming user 102 to make a selection in an area of the display 114 where the auxiliary content is being displayed. For example, if the auxiliary content is a car advert the user engagement instruction may ask the content consuming user 102 to tap a colour or car model that they prefer, or ask them to sign-up for a trial period by tapping a specific area of the display 104. Whilst auxiliary content is described in this example as advertising content, the auxiliary content is not limited to being advertising content, the auxiliary content may for example be a trailer for a movie or a TV programme.

The content consuming user 102 can engage with the auxiliary content by supplying an input to the user interface 202 e.g. by responding to the user engagement instruction by tapping a specific area of the display 105. When the content consuming user 102 responds, the media playback device 104 is configured to transmit a user engagement response to the auxiliary content providing server 110. This is illustrated by the "Interaction signal" data flow shown in FIG. 3b.

The auxiliary content providing server 110 detects whether or not the content consuming user 102 has responded properly by assessing whether an expected user actuation has been executed.

Figure 5A:
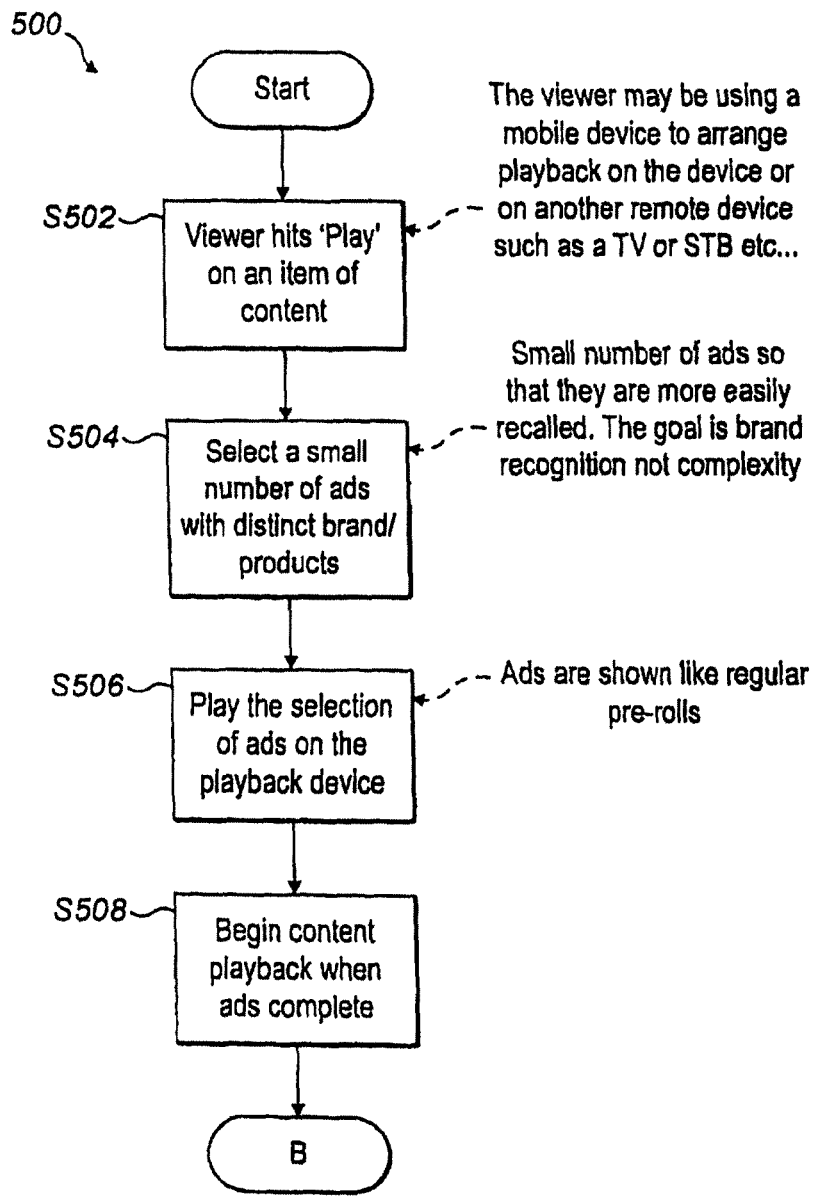
FIGS. 5a and 5b illustrates a flow chart for a process of detecting user engagement of auxiliary content.

A third method of how the auxiliary content providing server 110 may detect that the content consuming user 102 has interacted with a piece of auxiliary content is described with reference to FIGS. 5a and 5b.

At step S502, the content consuming user 102 selects to consume an item of media content. As described above, in response to detecting this selection, the playout controller 204 is configured to transmit a request for the desired media content over the network 106 to the primary content server 108, and in response, receive the desired media content from the primary content server 108.

In response to the playout controller 204 determining that the desired media content is associated with pre-roll auxiliary content then the playout controller 204 is configured to transmit a request for pre-roll auxiliary content (an advert manifest) to the auxiliary content server 110. At step S504, in response to receiving this request, the auxiliary content server 110 selects auxiliary content that should be played out by the media playback device 104 before the start of their chosen media content (i.e. select "pre-roll" auxiliary content). The selected auxiliary content may be associated with the media content's pre-roll break for auxiliary content. Alternatively, the selected auxiliary content may not be associated with the media content's pre-roll break for auxiliary content i.e. the selected auxiliary content is ad-hoc auxiliary content.

After step S504, the auxiliary content server 110 is configured to transmit auxiliary content information to the media playback device 104. The auxiliary content information includes, for each piece of selected auxiliary content, an identifier of a network storage location in the network 106 where the selected auxiliary content is stored and other metadata associated with the piece of auxiliary content. At least one of these pieces of selected auxiliary content is indicated as being associated with a user engagement feature, for example using a flag or other type of identifier.

In response to receiving the advertising content information from the auxiliary content server 110, the media playback device 104 is configured to retrieve the selected auxiliary content from the auxiliary content store(s) 112 using the identifier(s) in the received advertising content information, and at step S506 control the playout of the retrieved auxiliary content by the playback module 208 prior to playout of the selected media content.

Once playout of the auxiliary content at step S506 is complete the playout controller 204 is configured to control the playback module 208 to playout the desired media content (retrieved from the primary content providing server 108) at step S508.

Having played out the auxiliary content that is associated with the user engagement feature at step S506, playout controller 204 is configured to the wait for a period of time at step S510 whilst the desired media content is being played out, before proceeding to step S512. This period of time may be a function of the length of the desired media content and/or the placement of any first mid-roll in the desired media content.

The playout controller 204 is configured to detect at step S510, that the period of time has elapsed since playout of the desired media content to the content consuming user 102 was started by the playback module 208.

At step S512, the auxiliary content server 110 is configured to transmit user engagement data associated with a piece of selected auxiliary content to the companion user device 114 which causes user engagement options 604 to be shown on the display 115 of the companion user device 114 (S512a) and a user engagement element 602 to be shown on the display 115 of the companion user device 114 in the form of a question displayed to the content consuming user 102 (S512b).

Figure 6:
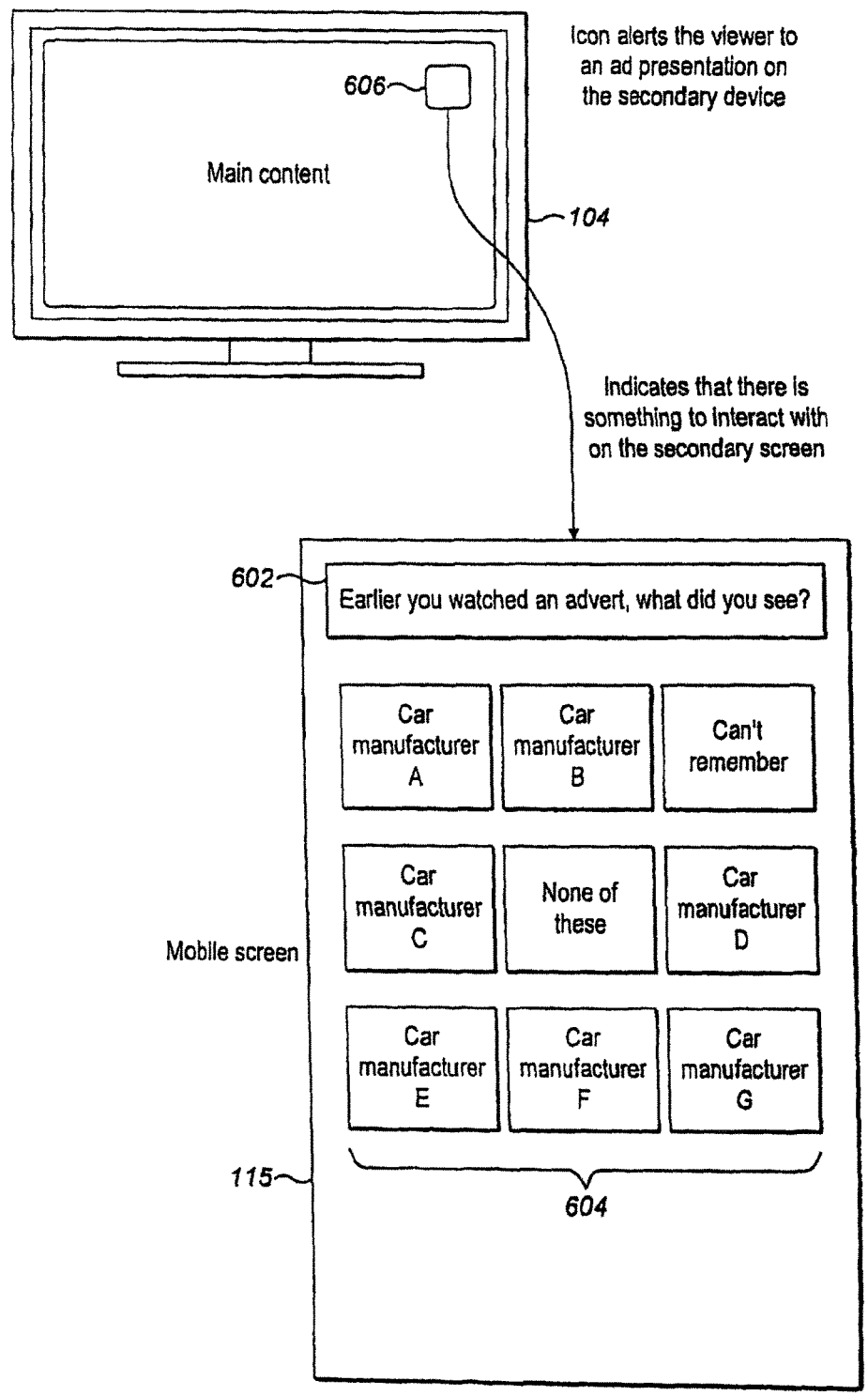
FIG. 6 illustrates transmission of user engagement data to the media playback device and a companion device associated with the content consuming user.

The display of the user engagement element 602 and the user engagement options 604 on the display 115 of the companion user device 114 is shown in FIG. 6.

The content consuming user 102 can select one of the user engagement options 604 by tapping a specific area of the display 115 corresponding to a user engagement option 604.

As shown in FIG. 6, the media playback device 104 may display a user engagement icon 606 on display 104 during playout of the selected media content. The user engagement icon 606 alerts the content consuming user 102 that user engagement information is presented on the companion user device 114 i.e. there is something to interact with on the second screen.

As shown in FIG. 6, the user engagement element 602 prompts the content consuming user to select a user engagement option that corresponds to a piece of auxiliary content previously played out at step S506 by the playback module 208 prior to the desired media content.

One of the user engagement options 604 may correspond to a piece of selected auxiliary content (previously played out by the playback module 208 prior to the desired media content at step S506). One or more other user engagement options 604 do not correspond to the piece of selected auxiliary content, these other user engagement options correspond to other pieces of selected auxiliary content not played out prior to the desired media content. The user engagement options 604 may also include an option for the content consuming user 102 to indicate that they cannot remember what auxiliary content was played out prior to the desired media content, and/or an option for the content consuming user 102 to indicate that none of the user engagement options 604 correspond to auxiliary content that was played out prior to the desired media content.

As a mere example to illustrate the concept, if the auxiliary content played out at step S506 includes advertising content for a car manufactured by a car manufacturer (e.g. car manufacturer A) then one of the user engagement options 604 may be a logo for the car manufacturer A and the other user engagement options 604 may be logos for other car manufacturers that manufacture cars not featured in the advertising content.

The content consuming user 102 can respond to the user engagement element 602 at their leisure, so they are not unduly distracted from the main content output by the media playback device 104. The first opportunity to recall a brand/product may not occur within the first few minutes of the main content (being output) due to step S510 being performed. The content consuming user 102 can respond as the interactions are presented to them, or all at once, or at the end of the main content, or whenever the content consuming user 102 chooses.

When the content consuming user 102 responds, the media playback device 104 is configured to transmit a user engagement response to the auxiliary content providing server 110. This is illustrated by the "Interaction signal" data flow shown in FIG. 3b.

The auxiliary content providing server 110 detects whether or not the content consuming user 102 has responded properly by assessing whether an expected user actuation has been executed (for example whether the content consuming user 102 has successfully recalled a brand or logo associated with auxiliary content displayed at step S506).

In one embodiment the period of time referred to above is greater than five minutes to ensure that the brand or logo is really being recalled.

Referring back to the process 400 shown in FIG. 4, once the auxiliary content providing server 110 detects that the content consuming user 102 has interacted with a piece of auxiliary content in accordance with expected activity the process 400 proceeds to step S404 where the auxiliary content providing server 110 determines the reward point value for the consumption or interaction with auxiliary content detected at step S402. Reward points provided based on the content consuming user 102 consuming auxiliary content may be lower than the reward points provided based on the content consuming user 102 interacting with auxiliary content. In terms of consumption (e.g. viewing/listenting) of auxiliary content, auxiliary content that is longer in length than other shorter auxiliary content may earn the content consuming user 102 more reward points than consumption of the shorter auxiliary content. In terms of interacting with auxiliary content, auxiliary content that require more detailed interactions may earn the content consuming user 102 more reward points than auxiliary content that require simpler interactions.

The auxiliary content providing server 110 communicates the reward point value determined at step S404 to the reward point accumulator 306 this is illustrated by the "Add points for viewed ads to user account" data flow shown in FIG. 3b. This enables the reward point accumulator 306 to communicate the reward point balance of each user of the content delivery system 100 to the respective users. FIG. 3b illustrates the reward point accumulator 306 communicating the reward point balance of the content consuming user 102 to the media playback device 104 by way of the "Points balance" data flow.

As described above, the reward point accumulator 306 may be implemented on the server implementing the user profile service component 304. Thus in this embodiment, at step S406, the auxiliary content providing server 110 communicates the reward point value determined at step S404 to the reward point accumulator 306 on the user profile service 304 so that the reward point value determined at step S404 are added to reward point balance associated with a media consumption account associated with the content consuming user 102. This is illustrated by the "Points accumulated" data flow shown in FIG. 3a.

Figure 5B:
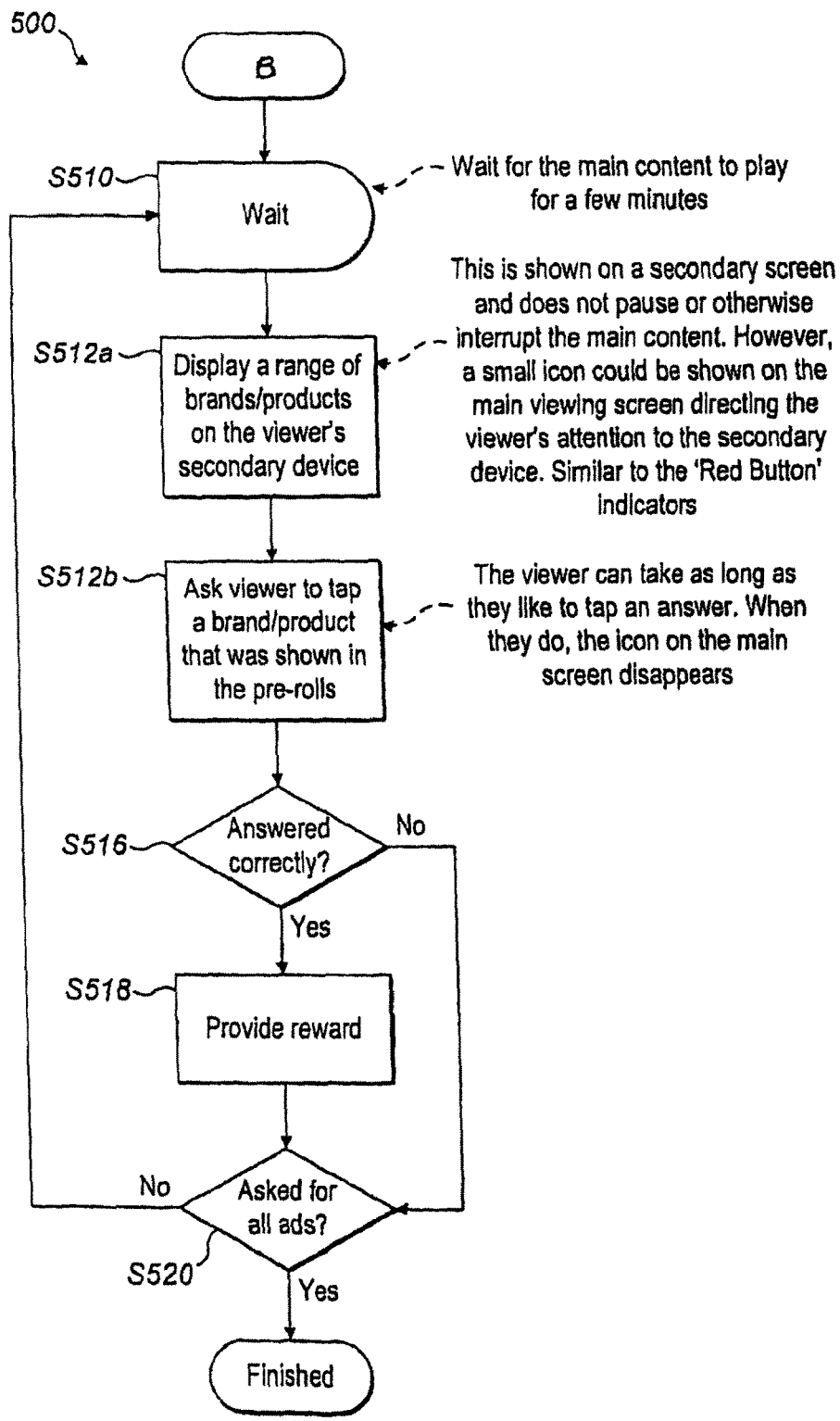

Referring back to the process 500 illustrated in FIG. 5b, this reward point issuance is performed at step S518.

In response to the determination at step S510, for each selected auxiliary content played out by the playback module 208 at step S506 prior to the playout of the desired media content at step S508, the auxiliary content server 110 is configured to perform steps S512a, S512b, S516, and S518. This is controlled by the auxiliary content server 110 performing a check at step S520 to determine whether user engagement data for each piece of selected auxiliary content played out at step S506 has been transmitted to the companion user device 114.

In order to consume desired content within limits of a constrained resource, the content consuming user 102 is able to redeem accumulated reward points on rewards that enhance the overall content consumption experience of the content consuming user 102. Embodiments discussed below enable flexibility as to when redemption of accumulated reward points may occur.

Prior to selection of desired media content, the content consuming user 102 may redeem accumulated reward points on one or more rewards.

A list of rewards available for redemption by the content consuming user 102 is communicated from the rewards service 302 to either the media playback device 104 or the companion user device 114 associated with the content consuming user 102 for display to the content consuming user 102. This is illustrated by the "list of affordable rewards" data flow shown in FIG. 3a (list of rewards communicated to the companion user device 114) and the "affordable, applicable rewards available" data flow shown in FIG. 3b (list of rewards communicated to the media playback device 104).

Each reward in the list of rewards is associated with a number of reward points required to redeem the reward. By a device (the media playback device 104 or the companion user device 114) having access to the list of rewards (and the reward point value associated with each reward in the list) and the reward point balance associated with the media consumption account of the content consuming user 102, the device is able to display a subset of rewards (in the list of rewards) to the content consuming user 102, the reward point value associated with each reward in the subset of rewards having a reward point value equal to or less than the reward point balance associated with the media consumption account of the content consuming user 102.

A reward in the list of rewards may have a lasting effect following redemption which is limited by a predetermined period of time. For example, the list of rewards may include a reward that enables (i) no mid-roll auxiliary content (auxiliary content that is required to be output during output of desired media content) in TV shows for 48 hours (following redemption), (ii) no pre-roll auxiliary content (auxiliary content that is required to be output prior to output of desired media content) before TV shows for 48 hours (following redemption), and/or (iii) no mid-roll auxiliary content in movies for 48 hours (following redemption) etc. Alternatively a reward in the list of rewards may have a lasting effect following redemption which is limited by a predetermined number of usage instances. For example, the list of rewards may include a reward that enables no pre-roll auxiliary content in a predetermined number of movies.

It will be appreciated that the above described rewards are merely examples. Whilst each of the described rewards has the same expiry time period, the rewards list may include rewards that are associated with different expiry time periods. Whilst each of the described rewards is associated with a particular content type (e.g. TV show, movie), the rewards list may include rewards that are not associated with a particular content type (e.g. no mid-roll auxiliary content in all media content for 48 hours).

When a reward is purchased by the content consuming user 102 by making a selection on the media playback device 104 or the companion user device 114, this reward purchase is communicated to the rewards service 302. This is illustrated by the "request to purchase reward" data flow shown in FIG. 3a (selection of reward made using companion user device 114) and the "purchase reward" data flow shown in FIG. 3b (selection of reward made using the media playback device 104).

When a reward is purchased by the content consuming user 102, the rewards service 302 is configured to communicate this purchase to the user profile service 304. This is illustrated by the "updates list of purchased rewards" data flow shown in FIG. 3a.

When a reward is purchased by the content consuming user 102, the rewards service 302 is also configured to communicate this purchase to the reward point accumulator 306 this is illustrated by the "consume points" data flow shown in FIG. 3b. This enables the reward point accumulator 306 to communicate the updated reward point balance of the content consuming user 102 to the media playback device 104 by way of the "Points balance" data flow.

When the auxiliary content providing server 110 is required to select auxiliary content for the content consuming user 102, the auxiliary content providing server 110 is configured to ask the user profile service 304 for details of any currently valid rewards that have been purchased by the content consuming user 102. In response, the user profile service 304 is configured to communicate details of currently valid rewards to the auxiliary content providing server 110. This is illustrated by the "rewards available" data flow shown in FIG. 3a.

Figure 7:
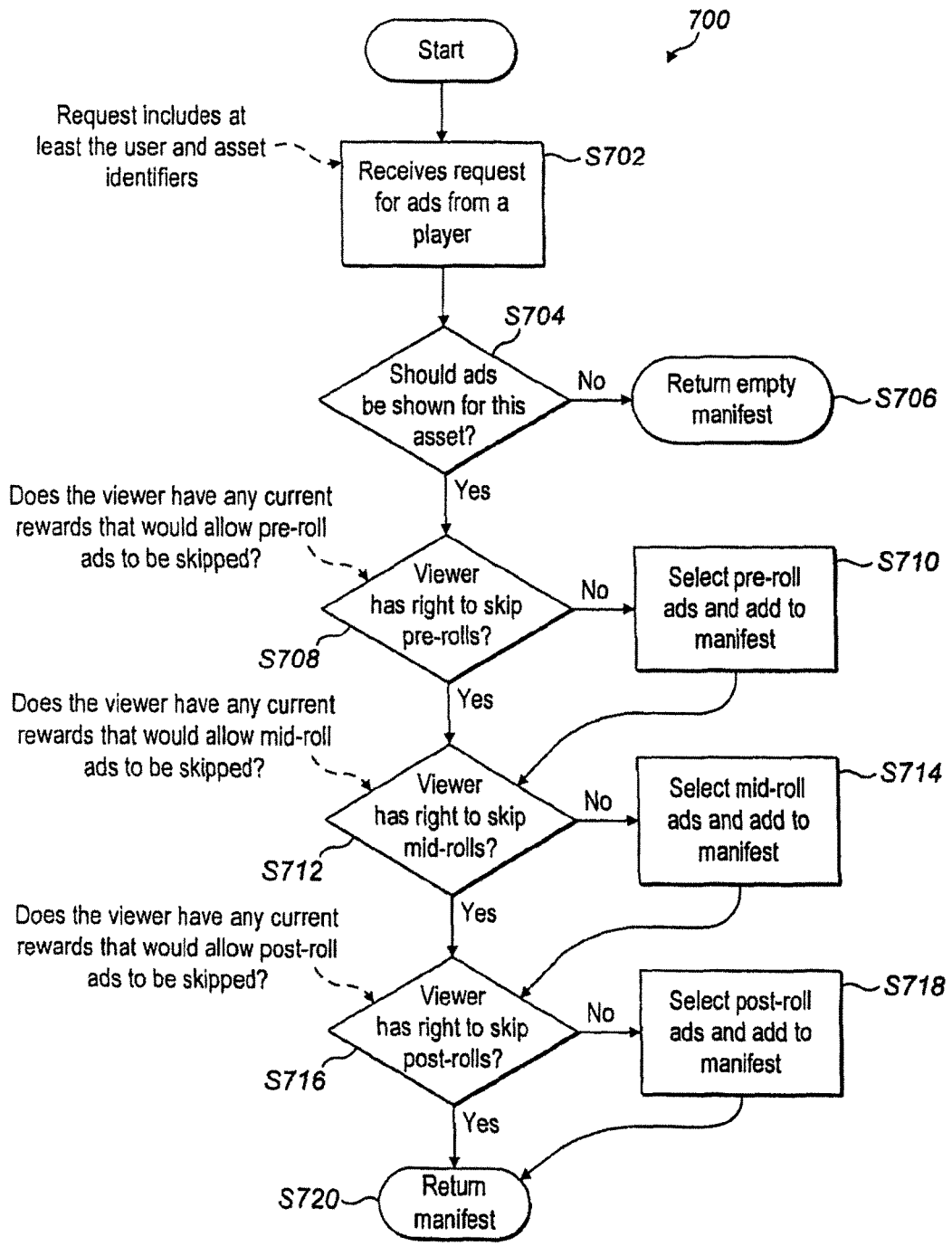
FIG. 7 illustrates a flow chart for a process that enables that the content consuming user to consume desired media content within the limits of a constrained resource.

Reference is now made to FIG. 7 which illustrates a process 700 performed by the auxiliary content server 110 that enables that the content consuming user 102 to consume desired media content within the limits of the constrained resource.

The process 700 starts in response to the content consuming user 102 selecting to consume an item of media content. As described above, in response to detecting this selection, the playout controller 204 is configured to transmit a request for the desired media content over the network 106 to the primary content server 108, and in response, receive the desired media content and metadata associated with the desired media content from the primary content server 108.

In response to receipt of the desired media content and its associated metadata, the playout controller 204 is configured to transmit a request for auxiliary content insertion information (e.g. an ad manifest) that is associated with the desired media content to the auxiliary content server 110. The request includes an identifier of the content consuming user 102 (e.g. an account number of a media consumption account of the content consuming user 102) and an identifier of the desired media content.

At step S702, the auxiliary content server 110 receives this request for auxiliary content insertion information.

At step S704, the auxiliary content server 110 is configured to determine whether the desired media content is to be consumed in a playout session at the media playback device 104 with auxiliary content inserted in the playout session using the identifier of the content consuming user 102 and the identifier of the desired media content in the received request.

The auxiliary content server 110 may obtain information on one or any combination of: a genre of the desired media content, a gender of the user, an age of the user and a device type of the user device, and determine the auxiliary content that is to be inserted in the playout session based on this information. The auxiliary content server 110 may obtain this information based on at extracting this information from the request for auxiliary content insertion information, and/ or (ii) accessing the information from a store in the content delivery system 100 (not shown in FIG. 1) using the identifier of the user.

If at step S704, the auxiliary content server 110 determines that the desired media content is to be consumed in a playout session at the media playback device 104 with no auxiliary content inserted in the playout session then the process proceeds to step S706 where the auxiliary content server 110 returns an empty manifest to the media playback device 104 (i.e. auxiliary content insertion information which does not include any metadata identifying auxiliary content is to be inserted in the playout session).

If at step S704, the auxiliary content server 110 determines that the desired media content is to be consumed in a playout session at the media playback device 104 with auxiliary content inserted in the playout session then the process 700 proceeds to step S708.

At step S708, the auxiliary content server 110 transmits a request to the user profile service component 304 for information on redeemed rewards associated with the user identifier for the content consuming user 102 by way of a reward query. The user profile service component 304 returns a response to the auxiliary content server 110 which includes information on redeemed rewards associated with the user identifier for the content consuming user 102. This is shown in FIG. 3a by the "rewards available" data received from the user profile service component 304.

The auxiliary content server 110 is configured to generate auxiliary content insertion information based on the identifier of the content consuming user 102, the identifier of the desired media content, and the information on redeemed rewards associated with the user identifier for the content consuming user 102.

At step S708, the auxiliary content server 110 determines whether the content consuming user 102 has a current reward that allows pre-roll auxiliary content to be skipped for the desired media content.

If the auxiliary content server 110 determines at step S708 that the content consuming user 102 does not have a current reward that allows pre-roll auxiliary content to be skipped for the desired media content, the process 700 proceeds to step S710 where the auxiliary content server 110 selects pre-roll auxiliary content and adds metadata identifying the selected pre-roll auxiliary content to the auxiliary content insertion information. The process 700 then proceeds to step S712.

If the auxiliary content server 110 determines at step S708 that the content consuming user 102 has a current reward that allows pre-roll auxiliary content to be skipped for the desired media content, in generating the auxiliary content information (e.g. the advert manifest) the auxiliary content server 110 is configured to not include any information pertaining to pre-roll auxiliary content in the auxiliary content insertion information based on this determination and the process 700 proceeds to step S712.

At step S712, the auxiliary content server 110 determines whether the content consuming user 102 has a current reward that allows mid-roll auxiliary content to be skipped for the desired media content.

If the auxiliary content server 110 determines at step S712 that the content consuming user 102 does not have a current reward that allows pre-roll auxiliary content to be skipped for the desired media content, the process 700 proceeds to step S714 where the auxiliary content server 110 selects mid-roll auxiliary content and adds metadata identifying the selected mid-roll auxiliary content to the auxiliary content insertion information. The process 700 then proceeds to step S716.

If the auxiliary content server 110 determines at step S712 that the content consuming user 102 has a current reward that allows mid-roll auxiliary content to be skipped for the desired media content in generating the auxiliary content insertion information (e.g. the advert manifest) the auxiliary content server 110 is configured to not include any information pertaining to mid-roll auxiliary content in the advertising content insertion information based on this determination and the process 700 proceeds to step S716.

At step S716, the auxiliary content server 110 determines whether the content consuming user 102 has a current reward that allows post-roll auxiliary content to be skipped for the desired media content.

If the auxiliary content server 110 determines at step S716 that the content consuming user 102 does not have a current reward that allows post-roll auxiliary content to be skipped for the desired media content, the process 700 proceeds to step S718 where the auxiliary content server 110 selects post-roll auxiliary content and adds metadata identifying the selected post-roll auxiliary content to the auxiliary content insertion information. The process 700 then proceeds to step S720.

If the auxiliary content server 110 determines that the content consuming user 102 has a current reward that allows post-roll auxiliary content to be skipped for the desired media content in generating the auxiliary content insertion information (e.g. the advert manifest) the auxiliary content server 110 is configured to not include any information pertaining to post-roll auxiliary content in the auxiliary content insertion information based on this determination and the process 700 proceeds to step S720.

For each piece of auxiliary content that is to be inserted in the playout session, metadata associated with the piece of auxiliary content that is included in the auxiliary content insertion information comprises at least (i) an identifier enabling access to the piece of auxiliary content stored in an auxiliary content store 112 connected to the communication network 106; and (ii) a timing offset indicating when the piece of auxiliary content is to be played out in the playout session in relation to the desired media content.

Furthermore for each piece of auxiliary content that is to be inserted in the playout session, the auxiliary content server 110 is configured to insert, in the metadata associated with the piece of auxiliary content, an event trigger that causes the media playback device 104 to transmit a tracking message to the auxiliary content server 110 upon detecting that playout of the piece of auxiliary content has been skipped by the user. The auxiliary content server 110 may be further configured to insert, in the metadata associated with the piece of auxiliary content one or more further event triggers e.g. an event trigger for when the first quarter of the piece of auxiliary content has played; another when it reaches half way; another at the three-quarter mark etc.

The tracking event reports allow the auxiliary content server 110 to measure which pieces of auxiliary content were started, which failed because the ad creative was unavailable; which piece(s) of auxiliary content were watched all the way through; which piece(s) of auxiliary content only reached the half-way point before the viewer quit playback etc.

A reward may be limited to pre/mid/post rolls, or a particular genre of content or to prime-time viewing (or not), an individual piece of content (a first run movie for example) etc.

At step S720, the auxiliary content server 110 is configured to transmit the generated auxiliary content insertion information over the communication network 106 to the media playback device 104. It will be appreciated that if the auxiliary content server 110 determines that the content consuming user 102 does not have any current rewards that would allow any auxiliary content to be skipped for the desired media content, the auxiliary content server 110 generates auxiliary content insertion information (e.g. an advert manifest) which includes metadata associated with auxiliary content identified at step S704.

Once the playback controller 204 has received the auxiliary content insertion information from the auxiliary content server 110 and the desired media content from the primary content providing server 108, the playback controller 204 has entire control of playback of desired media content and auxiliary content that is retrieved based on metadata identifying the auxiliary content that is included auxiliary content insertion information.

If the auxiliary content insertion information identifies pre-roll auxiliary content (i.e. the auxiliary content server 110 determined at step S708 that the consuming user 102 does not have any current rewards that would allow pre-roll auxiliary content to be skipped for the desired media content), then the playback controller 204 retrieves pre-roll auxiliary content from the auxiliary content store(s) 112 using the metadata in the received auxiliary content information and controls playout of the retrieved pre-roll auxiliary content prior to playout of the selected media content.

If the auxiliary content insertion information does not identify any pre-roll auxiliary content (i.e. the auxiliary content server 110 determined at step S708 that the content consuming user 102 does have a current reward that allows pre-roll auxiliary content to be skipped for the desired media content), the media playback device 104 does not retrieve any pre-roll auxiliary content from the auxiliary content store(s) 112 (as no pre-roll auxiliary content was identified in the received auxiliary content insertion information), and playout of the selected media content commences.

If the auxiliary content insertion information identifies mid-roll auxiliary content (i.e. the auxiliary content server 110 determined at step S712 that the consuming user 102 does not have any current rewards that would allow mid-roll auxiliary content to be skipped for the desired media content), then during playback of the desired media content the playout controller 204 is configured to detect that a break point associated with mid-roll auxiliary content (auxiliary content that is to be played out by the media playback device during the desired media content) is approaching and retrieve mid-roll auxiliary content from the auxiliary content store(s) 112 using the metadata in the received auxiliary content information and controls playout of the retrieved mid-roll auxiliary content during playout of the desired media content at S716

If the auxiliary content insertion information does not identify any mid-roll auxiliary content (i.e. the auxiliary content server 110 determined at step S712 that the content consuming user 102 does have a current reward that allows mid-roll auxiliary content to be skipped for the desired media content), the media playback device 104 does not retrieve any mid-roll auxiliary content from the auxiliary content store(s) 112 (as no mid-roll auxiliary content was identified in the received auxiliary content insertion information), and playout of the desired media content continues until the end of the desired media content.

If the auxiliary content insertion information identifies post-roll auxiliary content (i.e. the auxiliary content server 110 determined at step S716 that the consuming user 102 does not have any current rewards that would allow mid-roll auxiliary content to be skipped for the desired media content), then the playout controller 204 is configured to detect that the end of the desired media content is approaching and retrieve post-roll auxiliary content from the auxiliary content store(s) 112 using the metadata in the received auxiliary content information and controls playout of the retrieved post-roll auxiliary content after playout of the desired media content.

If the auxiliary content insertion information does not identify any post-roll auxiliary content (i.e. the auxiliary content server 110 determined at step S716 that the content consuming user 102 does have a current reward that allows mid-roll auxiliary content to be skipped for the desired media content), the media playback device 104 does not retrieve any post-roll auxiliary content from the auxiliary content store(s) 112 (as no mid-roll auxiliary content was identified in the received auxiliary content insertion information).

As will be appreciated the adaption of the auxiliary content associated with desired media content by the auxiliary content information returned by the auxiliary content server 110 to the media playback device 104 in the process 700 enables the content consuming user 102 to consume the desired media content within the limits of the constrained resource.

It will be appreciated that the content consuming user 102 may have a current reward that allows only a portion of auxiliary content associated with a particular location in the desired media content (e.g. pre-roll, mid-roll) to be skipped. Thus in this scenario, the auxiliary content information (e.g. the advert manifest) will still include at least one identifier of auxiliary content that is to be retrieved from the auxiliary content store(s) 112 for playout at the location (break) in the desired media content. However it will be apparent that the amount of auxiliary content to be played out to the content consumer 102 will still be reduced which may enable the content consuming user 102 to consume the desired media content within the limits of the constrained resource.

Whilst it has been described above that prior to selection of desired media content, the content consuming user 102 may redeem accumulated reward points on one or more rewards. Embodiments of the present invention extend to the redemption of accumulated reward points on a reward after selection of desired media content.

Figure 8:
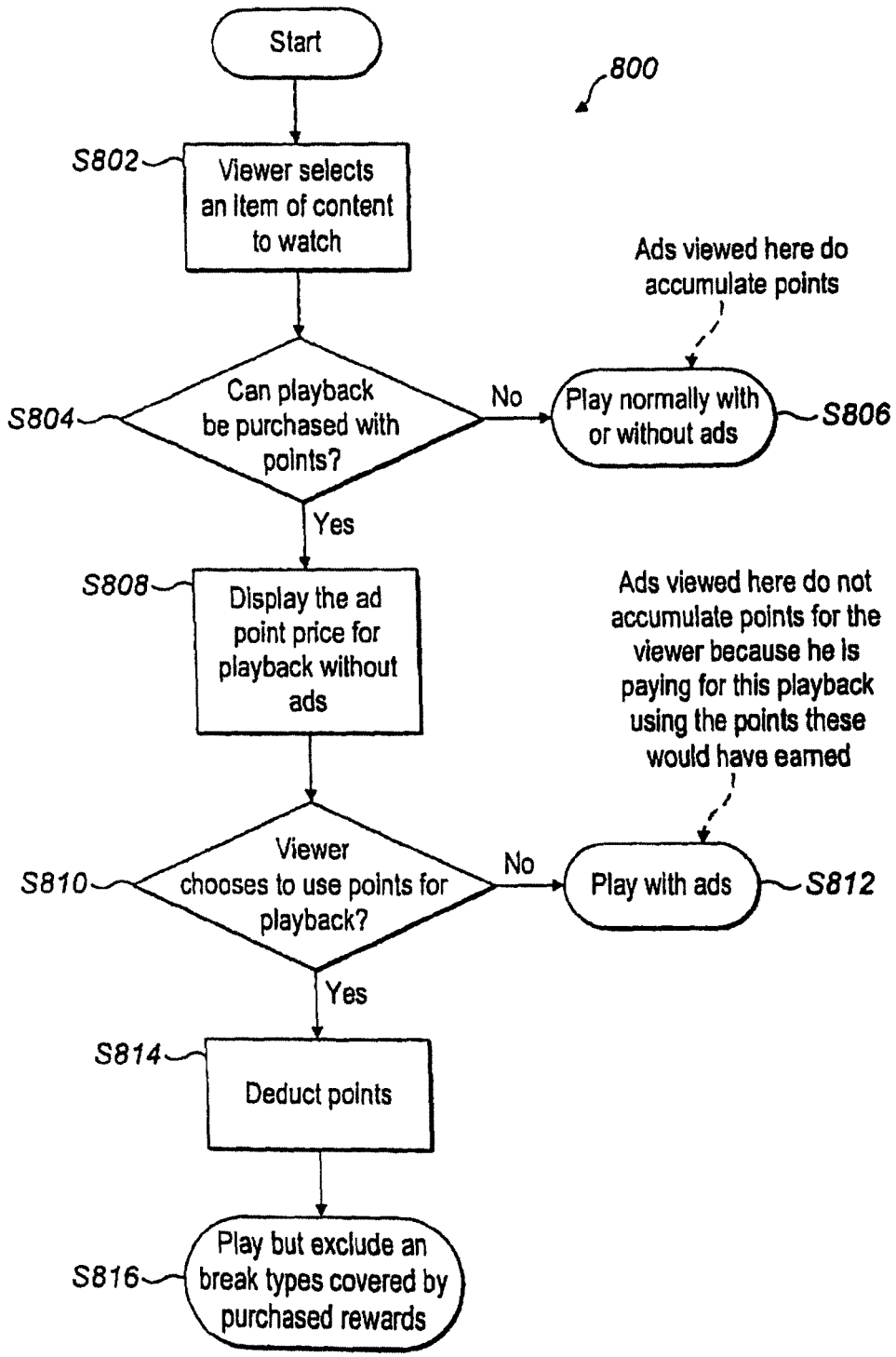
FIG. 8 illustrates a flow chart for a process that enables that the content consuming user to consume desired media content within the limits of a constrained resource.

Reference is now made to FIG. 8 which illustrates a process 800 that enables that the content consuming user 102 to consume desired media content within the limits of the constrained resource.

As described above, the media playback device 104 is arranged to display media content that is available for selection by the content consuming user 102 on the display 105 of the media playback device 104.

The media playback device 104 is arranged to display media content that is available for selection by the content consuming user 102 on the display 105 of the media playback device 104.

At step S802, the content consuming user 102 selects to consume an item of media content.

The selected media content may be associated with an auxiliary content break pattern that defines at least one break point at which auxiliary content is to be inserted into the playout stream (e.g. it is available for viewing with one or any combination of pre-roll, mid-roll, and post-roll auxiliary content). A list of rewards available for redemption by the content consuming user 102 is communicated from the rewards service 302 to either the media playback device 104 or the companion user device 114 associated with the content consuming user 102 for display to the content consuming user 102.

This rewards list may indicate that the selected media content is also available for viewing in one or more resource constrained playout modes with reduced auxiliary content for example: no pre-roll auxiliary content, no mid-roll auxiliary content, and no pre-roll or mid-roll auxiliary content. Each of these playback modes (content consumption formats) has an associated reward point price and is associated with a differing set of auxiliary content. One of the playback modes may allow the selected media content to be consumed in a playout session with no auxiliary content.

If playback of the selected media content in a resource constrained playout mode is not available, then the selected media content is retrieved (as described above) and output on the media playback device 104 at step S806. Consumption and/or interactions with auxiliary content associated with the selected media content that is output at step S806 allows the content consuming user 102 to accrue rewards points.

If playback of the selected media content in a resource constrained playout mode is available, then the media playback device 104 is arranged to display the reward points required to view the desired media content in one or more of these further playback modes at step S808.

If the content consuming user 102 does not select to redeem reward points to consume the desired media content in a resource constrained playout mode then the process 800 proceeds to step S812 whereby the selected media content is retrieved (as described above) and output on the media playback device 104 (including output of the auxiliary content).

If the content consuming user 102 does select to redeem reward points to consume the desired media content in a resource constrained playout mode then the process 800 proceeds to step S814 whereby the rewards service 302 communicates this reward purchase to the reward point accumulator 306. At step S814, The reward point accumulator 306 is configured to deduct the reward point price associated with the media content in the selected playback mode from the reward point balance associated with the media consumption account of the content consuming user 102.

The rewards service 302 also communicates this reward purchase to user profile service 304.

The primary content server 108 transmits the desired media content and metadata associated with the desired media content to the media playback device 104.

In response to detecting the auxiliary content identifier in the metadata associated with the desired media content, the playout controller 204 is further configured to transmit a request for auxiliary content insertion information to the auxiliary content server 110.

Upon receiving the request for auxiliary content insertion information (e.g. an advert manifest) from the media playback device 104, the auxiliary content providing server 110 is configured to ask the user profile service 304 for details of any currently valid rewards that have been purchased by the content consuming user 102. In response, the user profile service 304 is configured to communicate details of currently valid rewards to the auxiliary content providing server 110. Upon determining that the content consuming user 102 has redeemed points to consume the desired media content in a resource constrained playout mode, then the auxiliary content server 110 is configured to generate auxiliary content insertion information to not include any metadata associated with auxiliary content covered by the reward redeemed by the content consuming user 102.

The auxiliary content server 110 transmits the generated auxiliary content insertion information to the media playback device 104. Therefore, at step S816, the selected media content is played out on the media playback device 104 in accordance with the selected resource constrained playout mode whereby auxiliary content associated with the auxiliary content break type (pre-roll, mid roll) covered by the purchased reward is not output to the content consuming user 102.

As will be appreciated the generation of the auxiliary content insertion information by the auxiliary content server 110 in dependence on information on redeemed rewards associated with the user identifier for the content consuming user 102 enables the content consuming user 102 to consume the desired media content within the limits of the constrained resource.

Further flexibility is provided in that embodiments of the present invention also extend to the redemption of accumulated reward points on a reward during consumption of auxiliary content associated with desired media content.

The reward redeemed prior to selection of desired media content (FIG. 7) or redeemed after selection of desired media content (FIG. 8) may indicate that the output of the auxiliary content covered by the redeemed reward is to be deferred to a later point in time. For example defer the output of the auxiliary content to the next time a piece of desired media content is selected for consumption.

In this scenario, the auxiliary content server 110 is configured to store information identifying the auxiliary content covered by the redeemed reward and timing information providing an indication as to when the auxiliary content covered by the redeemed reward is to be played out.

This stored information is assessed by the auxiliary content server 110 in the generation of auxiliary content insertion information when it receives future requests for auxiliary content insertion information that includes an identifier of the content consuming user 102. For example the auxiliary content server 110 may cause the auxiliary content covered by the redeemed reward to be identified in auxiliary content insertion information the next time the auxiliary content server 110 receives a request for auxiliary content insertion information that includes an identifier of the content consuming user 102, or the next time the auxiliary content server 110 receives a request for auxiliary content insertion information that includes an identifier of the content consuming user 102 after a predetermined period of time has elapsed since the content consuming user 102 purchased the reward In another embodiment, the reward redeemed prior to selection of desired media content (FIG. 7) or redeemed after selection of desired media content (FIG. 8) may indicate that the auxiliary content covered by the redeemed reward is to be deferred to another device associated with the content consuming user 102, for example the companion user device 114.

The auxiliary content server 110 is configured to store information identifying the auxiliary content covered by the redeemed reward. This stored information is used by the auxiliary content server 110 in the generation of auxiliary content insertion information when it receives a request for auxiliary content insertion information from a companion user device 114 that includes an identifier of the content consuming user 102.

Thus the auxiliary content server 110 is configured to supply auxiliary content information (e.g. an advert manifest) to the companion user device 114 such that the auxiliary content covered by the redeemed reward is retrieved by the companion user device 114 from the one or more auxiliary content store 112 and output to the content consuming user 102 using the companion user device 114.

By deferring playout of auxiliary content to the companion user device 114, the desired media content may be played out on the media playback device 114 without interruption. Playout of auxiliary content on the companion user device 114, and playout of desired media content on the media playback device may occur simultaneously. This enables the content consuming user 102 to consume the desired media content within the limits of the constrained resource. Delivery of deferred auxiliary content to the companion user device 114 is illustrated by the "deferred ads" data flow shown in FIG. 3a.

Figure 9:
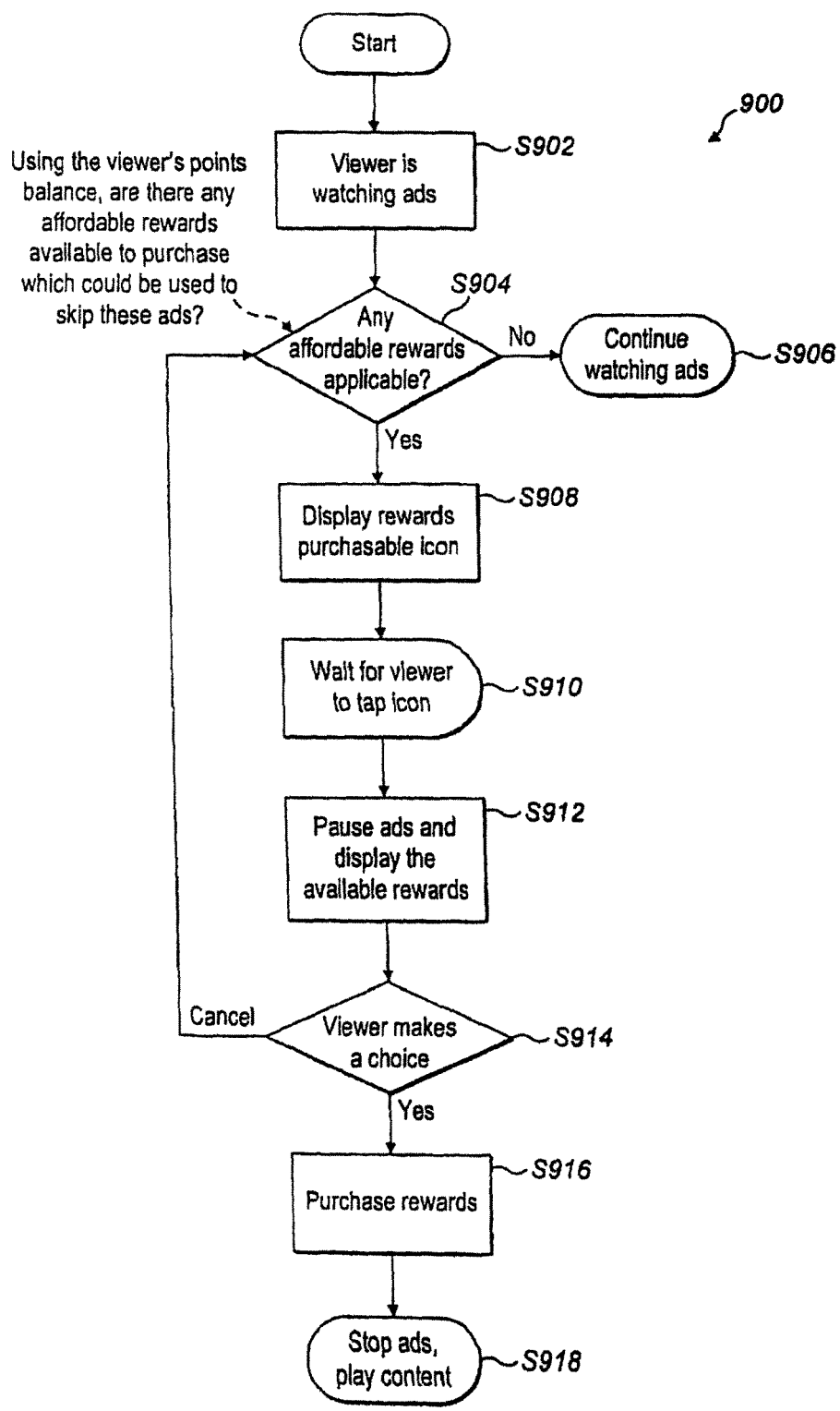
FIG. 9 illustrates a flow chart for a process that enables that the content consuming user to consume desired media content within the limits of a constrained resource.

Reference is now made to FIG. 9 which illustrates a process 900 that enables that the content consuming user 102 to consume desired media content within the limits of the constrained resource.

At step S902, the content consuming user 102 is consuming auxiliary content associated with selected desired media content. The auxiliary content may be pre-roll or mid-roll auxiliary content. The process of how this auxiliary content is retrieved and output by the media playback device 104 has been described above and is therefore not repeated here.

The playout controller 204 transmits a request to the rewards service 302 for a list of rewards available for redemption by the content consuming user 102. In response to receiving this request, the rewards service 302 transmits a request to the reward point accumulator 306 requesting the reward point balance associated with the media consumption account of the content consuming user 102, and in response receives the reward point balance associated with the media consumption account of the content consuming user 102 from the reward point accumulator 306.

The rewards service 302 is configured to determine whether there are rewards which are not currently held by the content consuming user 102 but which are affordable and are relevant to the current break for auxiliary content, and if so transmit a list of rewards that can be purchased by the content consuming user 102 to the media playback device 104.

At step S908, in response to receiving the list of rewards that can be purchased by the content consuming user 102, the playout controller 204 displays an icon on the display 105 of the media playback device 104 that indicates that a reward is purchasable.

The content consuming user 102 can select the displayed icon using the user interface 202. At step S910, the playout controller 204 waits until it detects selection of the displayed icon by the content consuming user 102.

In response to this detection, at step S912 the playout controller 204 pauses output of the auxiliary content and displays the rewards that are available to the content consuming user 102 on the display 105 of the media playback device 104.

At step S914, the playout controller 204 monitors whether it has received a selection by the user to redeem one or more of the rewards displayed at step S914.

If the playout controller 204 detects that it has received a selection by the user to redeem one or more of the rewards displayed at step S912, then the process 900 proceeds to step S916 where the selected reward is purchased.

At step S916, the playout controller 204 transmits a purchase request of the selected reward to the rewards service 302. In response to receiving the purchase request, the rewards service 302 transmits a request to the reward point accumulator 306 requesting the reward point balance associated with the media consumption account of the content consuming user 102, and in response receives the reward point balance associated with the media consumption account of the content consuming user 102 from the reward point accumulator 306. The rewards service 302 communicates this reward purchase to the user profile service 304 so that this currently valid reward can be indicated to the auxiliary content providing server 110 on request. The rewards service 302 also communicates this purchase to the reward point accumulator 306. This enables the reward point accumulator 306 to communicate the updated reward point balance of the content consuming user 102 to the media playback device 104 by way of the "Points balance" data flow.

The rewards service 302 transmits a message to the media playback device 104 acknowledging successful purchase of the rewards and returns details of the auxiliary content which can be skipped.

Thus at step S918, the output of the current piece of auxiliary content being consumed is stopped by the playout controller 204 and the playout controller 204 controls the playback module 208 to playout the selected media content whereby any subsequent pieces of auxiliary content affected by the purchased reward are also skipped. For example if the content consuming user 102 acquires a permission voucher (reward) to skip mid-roll adverts while watching the second advert in the first mid-roll break, then this current advert, all further adverts in the first mid-roll ad break and all future mid-rolls in this playout session are skipped. This enables the content consuming user 102 to consume the desired media content within the limits of the constrained resource.

At step S918, upon detecting that one or more pieces of auxiliary content have been skipped, the event trigger inserted in the metadata associated with the one or more pieces of auxiliary content by the auxiliary content server 110 causes the media playback device 104 to transmit a tracking message to the auxiliary content providing server 110 for each piece of auxiliary content that is retrieved from an auxiliary content store 112 but which was unused stating how and why not. In this way, the media playback device 104 is able to report on auxiliary content that caused the content consuming user 102 to purchase a reward and at what point within them a reward was purchased.

Referring back to step S904, if the rewards service 302 determines that there are no rewards which are not currently held by the content consuming user 102 but which are affordable and are relevant to the current break for auxiliary content, the rewards service 302 does not transmit a list of rewards that can be purchased by the content consuming user 102 to the media playback device 104.

Referring back to step S914, if the playout controller 204 detects that the content consuming user 102 has selected not to redeem one or more of the rewards displayed at step S912, then the process 900 proceeds back to step S904 which is performed during playout of the next piece of auxiliary content.

Whilst the embodiment described with reference to FIG. 9 to alerting (during output of auxiliary content) that the content consuming user 102 has a reward is purchasable to skip output of auxiliary content. In another embodiment no such alert is output to the content consuming user 102.

The list of rewards (and the reward point value associated with each reward in the list) may include the reward point value to skip the output of a single piece of auxiliary content such that the single piece of auxiliary content is not played out to content consuming user 102. Thus based on the reward list and the reward point balance associated with the media consumption account of the content consuming user 102, in response to receiving a request that a single piece of auxiliary content is skipped the rewards service 302 is able to determine whether this request is actionable based on the reward point balance associated with the media consumption account of the content consuming user 102.

If the rewards service 302 determines that the request to skip the auxiliary content is actionable based on the reward point balance associated with the media consumption account of the content consuming user 102, the rewards service 302 transmits a message to the media playback device 104 acknowledging successful purchase of the reward and returns details of the piece of auxiliary content which can be skipped.

Thus, the playout controller 204 controls the playback module 208 to stop playout of the auxiliary content and may either (i) commence playout of further auxiliary content that is retrieved based on the auxiliary content information (e.g. an advert manifest) received from the auxiliary content server 110, or (ii) control the playback module 208 to playout the desired media content (if the skipped piece of auxiliary content was the last piece of auxiliary content to be played out in the break for auxiliary content in the playout of the desired media content). This enables the content consuming user 102 to consume the desired media content within the limits of the constrained resource.

The rewards service 302 communicates this reward purchase to the user profile service 304 and to the reward point accumulator 306 so that the updated reward point balance of the content consuming user 102 can be communicated to the media playback device 104.

An option to skip a single piece of auxiliary content may be displayed on the display 105 of the media playback device 104 regardless of whether the reward point balance associated with the media consumption account of the content consuming user 102 indicates that the reward to skip the output of a single piece of auxiliary content is affordable for the content consuming user 102 or not. If the reward to skip the output of a single piece of auxiliary content is not affordable for the content consuming user 102, the playout controller 204 may display a message on the display 105 of the media playback device 104 alerting them to this.

As an alternative, an option to skip a single piece of auxiliary content may be displayed on the display 105 of the media playback device 104 only if the reward point balance associated with the media consumption account of the content consuming user 102 indicates that the reward to skip the output of a single piece of auxiliary content is affordable for the content consuming user 102.

In a modification to the above described embodiment, in response to detecting that the content consuming user 102 has selected to skip a single piece of auxiliary content and that the request to skip the auxiliary content is actionable based on the reward point balance associated with the media consumption account of the content consuming user 102, the playout controller 204 is configured to transmit a request for auxiliary content information to the auxiliary content server 110 via the network interface 206 over the network 106, and in response, receive auxiliary content information from the auxiliary content server 110.

In response to receiving this auxiliary content information from the auxiliary content server 110, the playout controller 204 is configured to display one or more auxiliary content options (referenced in the auxiliary content information from the auxiliary content server 110) that correspond to respective one or more pieces of auxiliary content that the content consuming user 102 may select to consume at a later time (for example when they are next consuming media content not within the limits of a constrained resource). For example a list of advertisements may be displayed on the display 105 of the media playback device 104.

If the content consuming user 102 selects not to defer consumption of auxiliary content the playout controller 204 detects that the content consuming user 102 has selected to skip a single piece of auxiliary content and the playout controller 204 operates in accordance with the above described embodiment, If the content consuming user 102 selects one or more pieces of auxiliary content that the content consuming user 102 agrees to consume at a later time, the playout controller 204 is configured to transmit an indication of the selected one or more pieces of auxiliary content to the auxiliary content server 110. This information is stored by the auxiliary content server 110 and used in the generation of auxiliary content insertion information when a device associated with the content consuming user 102 later requests auxiliary content insertion information from the auxiliary content server 110. For example the auxiliary content server 110 may cause the selected one or more pieces of auxiliary content to be played the next time a piece of desired media content is selected for consumption by the content consuming user 102, or the next time a piece of desired media content is selected after a predetermined period of time has elapsed since the content consuming user 102 selects to consume the one or more pieces of auxiliary content at a later time.

The reward point value associated with the deferral of output of auxiliary content may be less than the reward point value associated with skipping of output of auxiliary content (such that the auxiliary content is not played out to content consuming user 102).

By agreeing to consume auxiliary content at a later time, the content consuming user 102 is able to consume the desired media content within the limits of a constrained resource.

As described above, the auxiliary content server 110 is configured to receive a tracking message for each piece of auxiliary content that was skipped at step S918.

The reward purchased at step S916 may allow the deferral of the output of auxiliary content covered by the reward (e.g. a single piece of auxiliary content, or all auxiliary content associated with one or more break types (e.g. pre-roll, mid-roll, post-roll) etc.) to a later point in time. For example defer the output of the auxiliary content to the next time a piece of desired media content is selected for consumption. The reward point value may be based on the amount of auxiliary content that is to be deferred.

When a piece of auxiliary content is skipped during playback because of a reward purchased during that playback, the tracking message would contain an indicator to say why the piece of auxiliary content has been skipped. In the case of a reward that allows deferral of the output of auxiliary content to a later point in time this indicator may for example take the form of "skipped, deferred".

In this scenario, in response to receiving such a tracking message the auxiliary content server 110 is configured to store information identifying the skipped piece of auxiliary content covered by the redeemed reward and timing information providing an indication as to when the piece of auxiliary content is to be played out. As described above, this stored information is assessed by the auxiliary content server 110 in the generation of auxiliary content insertion information when it receives future requests for auxiliary content insertion information that includes an identifier of the content consuming user 102.

The reward (purchased at step S916 may allow the deferral of the output of auxiliary content covered by the reward (e.g. a single piece of auxiliary content, or all auxiliary content associated with one or more break types (e.g. pre-roll, mid-roll, post-roll) etc.) to another device associated with the content consuming user 102, for example the companion user device 114.

In the case of a reward that allows deferral of the output of auxiliary content to another device, the indicator in the tracking message transmitted from the media playback device 104 to the auxiliary content server 110 may take the form of "skipped, redirected".

The media playback device 104 is configured to transmit a message to the companion user device 114 to cause the companion user device 114 to transmit its own request for auxiliary content insertion information to the auxiliary content server 110.

In response to receiving such a tracking message the auxiliary content server 110 is configured to store information identifying the skipped piece of auxiliary content covered by the redeemed reward. This stored information is used by the auxiliary content server 110 in the generation of auxiliary content insertion information when it receives the request for auxiliary content insertion information from a companion user device 114 that includes an identifier of the content consuming user 102.

The auxiliary content server 110 is configured to supply the generated auxiliary content insertion information (e.g. an advert manifest) to the companion user device 114 such that the auxiliary content covered by the redeemed reward is retrieved by the companion user device 114 from the one or more auxiliary content store 112 and output to the content consuming user 102 using the companion user device 114.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An auxiliary content management component for a content delivery system, the auxiliary content management component comprising:
a processor having an input configured to receive a request for auxiliary content information from a user device, the request comprising an identifier of a user associated with the user device and an identifier of desired media content transmitted to the user device from a media component; and
a store for holding at least one permission voucher for users of the content delivery system, the permission voucher indicating that auxiliary content for a user based on the received request can be deferred in a constrained playout mode in which auxiliary content associated with the desired media content is reduced for the user,
wherein the processor is configured to:
apply an analysis to the received request to determine auxiliary content information for the user for the desired media content;
apply a second analysis to determine if the constrained playout mode is enabled for the user;
carry out an access to the store, if the constrained playout mode is enabled, to identify the at least one permission voucher for the user;
apply a modification to generate adapted auxiliary content information based on the at least one permission voucher for the user, to exclude the deferred auxiliary content;
carry out an access to the store to store information identifying the deferred auxiliary content; and
carry out transmission of the auxiliary content information to the user device during a playout session,
wherein on a subsequent request for auxiliary content from the user, the processor is configured to access the store to determine whether playout of auxiliary content has previously been deferred, and apply such deferred auxiliary content responsive to such subsequent request.

2. An auxiliary content management component according to claim 1, wherein for each piece of auxiliary content that is to be inserted in the playout session, metadata associated with the piece of auxiliary content comprises at least (i) an identifier enabling access to the piece of auxiliary content stored in an auxiliary content store connected to the communication network; and (ii) a timing offset indicating when the piece of auxiliary content is to be played out in the playout session in relation to the desired media content.

3. An auxiliary content management component according to claim 2, wherein for each piece of auxiliary content that is to be inserted in the playout session, metadata associated with the piece of auxiliary content further comprises an event trigger that causes the user device to transmit a tracking message to the auxiliary content management component upon detecting that playout of the piece of auxiliary content has been skipped by the user.

4. An auxiliary content management component according to claim 1, wherein the at least one permission voucher comprises a permission voucher granting permission for the user to consume the desired media content in the playout session with no auxiliary content inserted in at least one location in the playout session, and the auxiliary content management component is configured to generate the auxiliary content information to not include any metadata of auxiliary content to be inserted at said at least one location that would otherwise be included by the auxiliary content management component based on only the identifier of the user and the identifier of the desired media content.

5. An auxiliary content management component according to claim 1, wherein the at least one permission voucher comprises a permission voucher granting permission for the user to consume the desired media content in the playout session with reduced auxiliary content inserted in at least one location in the playout session, and the auxiliary content management component is configured to generate the auxiliary content information to include metadata identifying a reduced number of pieces of auxiliary content to be inserted at said at least one location than that which would otherwise be identified based on only the identifier of the user and the identifier of the desired media content.

6. An auxiliary content management component according to claim 1, wherein the auxiliary content that is to be deferred, is to be played out to the user at a later point in time, and the auxiliary content management component is configured to store the metadata of the auxiliary content and timing information indicating when the auxiliary content is to be played out to the user, for use in generating auxiliary content information when a subsequent request for auxiliary content information is received that comprises the identifier of the user.

7. An auxiliary content management component according to claim 1, wherein the auxiliary content that is to be deferred, is deferred to a companion user device associated with the user, and the auxiliary content management component is configured to store the metadata of the auxiliary content for use in generating auxiliary content information when a subsequent request for auxiliary content information is received from the companion user device that comprises the identifier of the user.

8. An auxiliary content management component according to claim 1, wherein the at least one permission voucher grants permission for the user to consume the desired media contact in at least one location, the at least one location comprising one or any combination of:
   a location before playout of the desired media content;
   one or more locations during playout of the desired media content; and
   a location after playout of the desired media content.

9. An auxiliary content management component according to claim 1, further configured to obtain information on one or any combination of: a genre of the desired media content, a gender of the user, an age of the user and a device type of the user device, and determine the auxiliary content that is to be inserted in the playout session based on said information; wherein the auxiliary content management component is configured to obtain said information based on at least one of: (i) extracting said information from said request, and (ii) accessing said information from a store in the content delivery system using the identifier of the user.

10. A content delivery system comprising:
   a communication network;
   a media component connected to the communication network and configured in response to receiving a request for desired media content from a user device, to transmit the desired media content and metadata associated with the media content to the user device;
   a store holding permission vouchers for users of the content delivery system;
   an auxiliary content management component according to claim 1.

11. A method for an auxiliary content management component in a content delivery system, the method comprising:
   receiving, by a processor, a request for auxiliary content information from a user device, the request comprising an identifier of a user associated with the user device and an identifier of desired media content transmitted to the user device from a media component;
   storing, by the processor, at least one permission voucher for users of the content delivery system, the permission voucher indicating that auxiliary content for a user based on the received request can be deferred in a constrained playout mode in which auxiliary content associated with the desired media content is reduced for the user,
   applying, by the processor, an analysis to the received request to determine auxiliary content information for the user for the desired media content;
   applying, by the processor, a second analysis to determine if the constrained playout mode is enabled for the user;
   carrying out, by the processor, an access to the store, if the constrained playout mode is enabled, to identify at least one permission voucher for the user;
   applying a modification, by the processor, to generate adapted auxiliary content information based on the identifier of the user, to exclude the deferred auxiliary content;
   carrying out, by the processor, an access to the store to store information identifying the deferred auxiliary content; and
   carrying out transmission, by the processor, of the adapted auxiliary content information to the user device,
   wherein on a subsequent request for auxiliary contents form the user, the processor is configured to access the store to determine whether playout of auxiliary content has previously been deferred, and apply such deferred auxiliary contents responsive to such subsequent request.

12. A method according to claim 11, wherein
   the desired media content is transmitted to the user device with metadata associated with the media content; and
   the desired media content and metadata associated with the media content are transmitted to the user device in response to the media component receiving a request for the desired media content from the user device.

13. A viewing device configured to control content to be viewed on the viewing device, the viewing device comprising:
   a user interface having an input configured detect a selection by a user of desired content to be viewed on the viewing device; and
   a network interface having an output configured to request the desired content from a media server; and
   an input configured to receive the desired content from the media server, the desired content associated with auxiliary content to be played out by a player of the device in a playout session comprising auxiliary content and the desired content;
   wherein the user interface is configured to:
   carry out display to a user an option for desired content in a content consumption format with reduced auxiliary content;
   carry out detection of selection by the user of a constrained playout mode, comprising detecting that the user has selected a content consumption format with reduced auxiliary content;
   carry out detection of selection by the user to skip playout of at least one piece of the reduced auxiliary content;
   carry out generation of a request to a control module to seek permission that the constrained playout mode is available to the user; and
   carry out playout of the current playing session, on receiving a permission signal from the control module, on the viewing device in the constrained playout mode, comprising adapting playback of the desired content to skip playout of the at least one piece of the reduced auxiliary content in the playout session;
   wherein for each piece of skipped auxiliary content, generate and transmit a tracking message to an auxiliary content management component to indicate that the piece of auxiliary content has been skipped, wherein the tracking message comprises an identifier to cause the skipped auxiliary content to be deferred.

14. A viewing device according to claim 13, further configured to:
receive and display to a user a list of content consumption formats for a piece of content, each format being associated with a differing set of auxiliary content, and
display a points balance to a user to enable a user to determine whether selection of the constrained playout mode will receive a permission signal.

15. A viewing device according to claim 14, further configured to display to a user an icon indicating that a constrained playout mode permitting skipping of the auxiliary content is available; and
if a permission signal is not received, display a message to a user indicating that the option of the constrained playout mode is not available.

16. A viewing device according to claim 13, wherein the detection of selection by the user of a constrained playout mode is effected after auxiliary content has commenced to play in the playout session, and wherein the causing of the current playout session to be played out in the constrained playout mode comprises adapting playback of the desired content to skip playout of auxiliary content in the playout session that is identified based on the permission signal.

17. A viewing device according to claim 13, wherein the skipped auxiliary content to be deferred is to be played out on a companion viewing device associated with the user.

18. A viewing device according to claim 13, wherein the skipped auxiliary content is to be deferred is to be played out in a future playout session on the viewing device.

19. A viewing device according to claim 13, further configured to, for each piece of skipped auxiliary content,
receive a list of options for alternative auxiliary content to be played out after the current playout session;
detect selection by the user of one of the options;
play out the current playout session including the desired content; and
cause the selected option of auxiliary content to be played out in a future playout session on the viewing device or on a companion viewing device associated with the user.

20. A computer implemented method on a viewing device according to claim 13.

* * * * *